United States Patent
Laghate et al.

(10) Patent No.: US 11,184,863 B2
(45) Date of Patent: Nov. 23, 2021

(54) UPLINK BEAM SELECTION IN MILLIMETER WAVE SUBJECT TO MAXIMUM PERMISSIBLE EXPOSURE CONSTRAINTS

(71) Applicant: QUALCOMM Incorporated, San Diego, CA (US)

(72) Inventors: Mihir Vijay Laghate, San Diego, CA (US); Raghu Narayan Challa, San Diego, CA (US); Junsheng Han, Sunnyvale, CA (US); Ruhua He, San Diego, CA (US); Hongbo Yan, Vista, CA (US)

(73) Assignee: QUALCOMM Incorporated, San Diego, CA (US)

( * ) Notice: Subject to any disclaimer, the term of this patent is extended or adjusted under 35 U.S.C. 154(b) by 115 days.

(21) Appl. No.: 16/595,309

(22) Filed: Oct. 7, 2019

(65) Prior Publication Data

US 2020/0112926 A1 Apr. 9, 2020

Related U.S. Application Data

(60) Provisional application No. 62/742,760, filed on Oct. 8, 2018, provisional application No. 62/755,983, filed on Nov. 5, 2018.

(51) Int. Cl.
*H04W 52/36* (2009.01)
*H04W 72/04* (2009.01)
(Continued)

(52) U.S. Cl.
CPC ......... *H04W 52/365* (2013.01); *H04L 5/0048* (2013.01); *H04W 16/28* (2013.01);
(Continued)

(58) Field of Classification Search
CPC ............. H04W 52/365; H04W 72/046; H04W 52/367; H04W 52/242; H04W 16/28; H04L 5/0048; H04B 7/0404; H04B 7/0695
See application file for complete search history.

(56) References Cited

U.S. PATENT DOCUMENTS

2011/0044193 A1* 2/2011 Forenza ................. H04W 24/08 370/252
2013/0309981 A1* 11/2013 Ngai ..................... H04B 7/0602 455/78

(Continued)

OTHER PUBLICATIONS

International Search Report and Written Opinion—PCT/US2019/055216—ISA/EPO—dated Jan. 27, 2020.

(Continued)

*Primary Examiner* — Fahmida S Chowdhury
(74) *Attorney, Agent, or Firm* — Harrity & Harrity, LLP

(57) ABSTRACT

Various aspects of the present disclosure generally relate to wireless communication. In some aspects, a user equipment (UE) may determine, for a candidate UE uplink beam, a transmit power due to a maximum permissible exposure (MPE) constraint; estimate, for the candidate UE uplink beam, a receive power for a base station based at least in part on the transmit power due to the MPE constraint; determine a target receive power for the base station; and select the candidate UE uplink beam as an active UE uplink beam based at least in part on the estimated receive power for the base station and the target receive power for the base station. Numerous other aspects are provided.

30 Claims, 12 Drawing Sheets

(51) Int. Cl.
  *H04L 5/00* (2006.01)
  *H04W 52/24* (2009.01)
  *H04W 16/28* (2009.01)

(52) U.S. Cl.
  CPC ....... *H04W 52/242* (2013.01); *H04W 52/367* (2013.01); *H04W 72/046* (2013.01)

(56) References Cited

U.S. PATENT DOCUMENTS

| | | | |
|---|---|---|---|
| 2017/0033854 A1* | 2/2017 | Yoo | H04W 24/00 |
| 2018/0132197 A1* | 5/2018 | Lin | H04W 52/42 |
| 2018/0167897 A1 | 6/2018 | Sampath et al. | |
| 2018/0227862 A1* | 8/2018 | Liu | H04B 7/063 |
| 2018/0278318 A1 | 9/2018 | Chakraborty et al. | |
| 2019/0104476 A1* | 4/2019 | Lim | H04W 52/346 |
| 2019/0104477 A1* | 4/2019 | MolavianJazi | H04L 5/0023 |
| 2019/0253108 A1* | 8/2019 | Zhang | H04B 7/0404 |
| 2019/0349866 A1* | 11/2019 | Lin | H04W 52/365 |
| 2019/0387483 A1* | 12/2019 | Lee | H04W 52/42 |

OTHER PUBLICATIONS

Nokia, et al., "Decoupling DL and UL Beam Selection," 3GPP Draft, 3GPP TSG RAN WG1 Meeting #93, R1-1807189, 3rd Generation Partnership Project (3GPP), Mobile Competence Centre, 650, Route Des Lucioles, F-06921, Sophia-Antipolis Cedex, France, vol. RAN WG1, No. Busan, Korea, Apr. 21, 2018-Apr. 25, 2018, May 20, 2018 (May 20, 2018), XP051442386, 42 pages, Retrieved from the Internet: URL: http://www.3gpp.org/ftp/Meetings%5F3GPP%5FSYNC/RAN1/Docs/ [retrieved on May 20, 2018] Section 2.

* cited by examiner

| SRS Resource Configuration | Use Distinct UE beam pairs for UL and DL? |
|---|---|
| 1 | No SRS resource configured for antenna switching usage and/or codebook usage | Yes |
| 2 | All SRS (of usage antenna switching/codebook) are configured with long periodicity, e.g., long enough that channel estimation is unreliable such as 2560 slots, i.e., 3.2 seconds | Yes |
| 3 | 2 or more SRS configured such that at least 1 SRS resource set has usage = 'antenna switching' and at least 1 SRS resource set has usage = 'codebook' | Yes |
| 4 | Any other configuration, e.g., only 1 SRS configured or all SRS configured with same usage | No |

FIG. 10

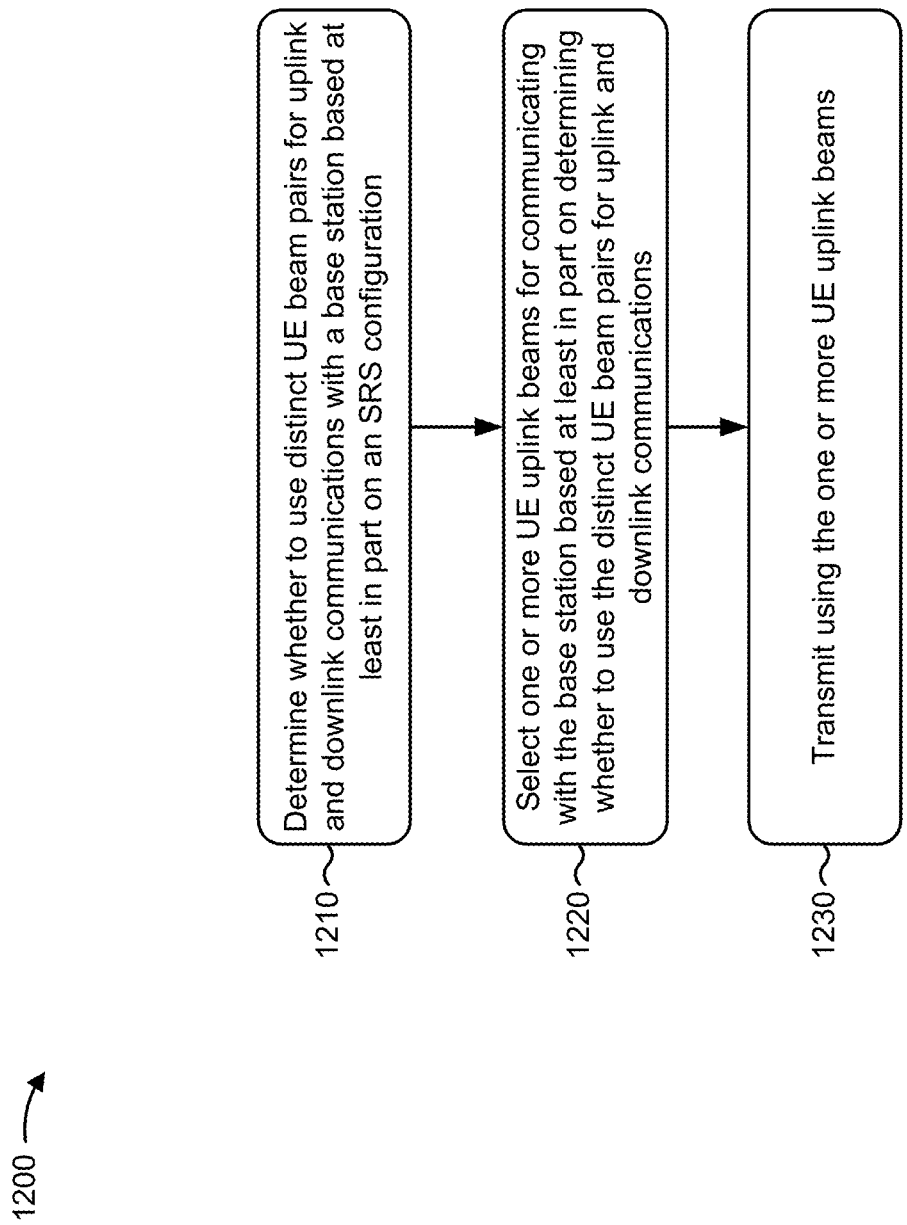

UPLINK BEAM SELECTION IN MILLIMETER WAVE SUBJECT TO MAXIMUM PERMISSIBLE EXPOSURE CONSTRAINTS

CROSS-REFERENCE TO RELATED APPLICATION

This application claims priority to U.S. Provisional Patent Application No. 62/742,760, filed on Oct. 8, 2018, entitled "UPLINK BEAM SELECTION IN MILLIMETER WAVE SUBJECT TO MAXIMUM PERMISSIBLE EXPOSURE CONSTRAINTS," which is hereby expressly incorporated by reference herein. This application also claims priority to U.S. Provisional Patent Application No. 62/755,983, filed on Nov. 5, 2018, entitled "UPLINK BEAM SELECTION IN MILLIMETER WAVE USING A SOUNDING REFERENCE SIGNAL CONFIGURATION," which is hereby expressly incorporated by reference herein.

FIELD OF THE DISCLOSURE

Aspects of the present disclosure generally relate to wireless communication and to techniques and apparatuses for uplink beam selection in millimeter wave subject to maximum permissible exposure constraints.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a new radio (NR) BS, a 5G Node B, and/or the like.

The above multiple access technologies have been adopted in various telecommunication standards to provide a common protocol that enables different user equipment to communicate on a municipal, national, regional, and even global level. New radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE, NR, and other technologies. These improvements may be applicable to other multiple access technologies and the telecommunication standards that employ these technologies.

SUMMARY

In some aspects, a method of wireless communication, performed by a user equipment (UE), may include determining, for a candidate UE uplink beam, a transmit power due to a maximum permissible exposure (MPE) constraint; estimating, for the candidate UE uplink beam, a receive power for a base station based at least in part on the transmit power due to the MPE constraint; determining a target receive power for the base station; and selecting the candidate UE uplink beam as an active UE uplink beam based at least in part on the estimated receive power for the base station and the target receive power for the base station.

In some aspects, a UE for wireless communication may include memory and one or more processors operatively coupled to the memory. The memory and the one or more processors may be configured to determine, for a candidate UE uplink beam, a transmit power due to a maximum permissible exposure (MPE) constraint; estimate, for the candidate UE uplink beam, a receive power for a base station based at least in part on the transmit power due to the MPE constraint; determine a target receive power for the base station; and select the candidate UE uplink beam as an active UE uplink beam based at least in part on the estimated receive power for the base station and the target receive power for the base station.

In some aspects, a non-transitory computer-readable medium may store one or more instructions for wireless communication. The one or more instructions, when executed by one or more processors of a UE, may cause the one or more processors to determine, for a candidate UE uplink beam, a transmit power due to a maximum permissible exposure (MPE) constraint; estimate, for the candidate UE uplink beam, a receive power for a base station based at least in part on the transmit power due to the MPE constraint; determine a target receive power for the base station; and select the candidate UE uplink beam as an active UE uplink beam based at least in part on the estimated receive power for the base station and the target receive power for the base station.

In some aspects, an apparatus for wireless communication may include means for determining, for a candidate apparatus uplink beam, a transmit power due to a maximum permissible exposure (MPE) constraint; means for estimating, for the candidate apparatus uplink beam, a receive power for a base station based at least in part on the transmit power due to the MPE constraint; means for determining a target receive power for the base station; and means for selecting the candidate apparatus uplink beam as an active apparatus uplink beam based at least in part on the estimated receive power for the base station and the target receive power for the base station.

In some aspects, a method of wireless communication, performed by a base station, may include selecting an active BS downlink beam based at least in part on a first metric reported by a user equipment (UE); selecting an active BS uplink beam based at least in part on a second metric, wherein the second metric is different from the first metric; and transmitting an indication of the active BS downlink beam and the active BS uplink beam to the UE, wherein the active BS downlink beam and the active BS uplink beam are indicated using different spatial references.

In some aspects, a base station for wireless communication may include memory and one or more processors operatively coupled to the memory. The memory and the one or more processors may be configured to select an active BS downlink beam based at least in part on a first metric reported by a user equipment (UE); select an active BS uplink beam based at least in part on a second metric, wherein the second metric is different from the first metric; and transmit an indication of the active BS downlink beam and the active BS uplink beam to the UE, wherein the active BS downlink beam and the active BS uplink beam are indicated using different spatial references.

In some aspects, a non-transitory computer-readable medium may store one or more instructions for wireless communication. The one or more instructions, when executed by one or more processors of a base station, may cause the one or more processors to select an active BS downlink beam based at least in part on a first metric reported by a user equipment (UE); select an active BS uplink beam based at least in part on a second metric, wherein the second metric is different from the first metric; and transmit an indication of the active BS downlink beam and the active BS uplink beam to the UE, wherein the active BS downlink beam and the active BS uplink beam are indicated using different spatial references.

In some aspects, an apparatus for wireless communication may include means for selecting an active apparatus downlink beam based at least in part on a first metric reported by a user equipment (UE); means for selecting an active apparatus uplink beam based at least in part on a second metric, wherein the second metric is different from the first metric; and means for transmitting an indication of the active apparatus downlink beam and the active apparatus uplink beam to the UE, wherein the active apparatus downlink beam and the active apparatus uplink beam are indicated using different spatial references.

In some aspects, a method of wireless communication, performed by a user equipment (UE), may include determining whether to use distinct UE beam pairs for uplink and downlink communications with a base station based at least in part on a sounding reference signal (SRS) configuration for the UE; selecting one or more UE uplink beams for communicating with the base station based at least in part on determining whether to use the distinct UE beam pairs for uplink and downlink communications; and transmitting using the one or more UE uplink beams.

In some aspects, a UE for wireless communication may include memory and one or more processors operatively coupled to the memory. The memory and the one or more processors may be configured to determine whether to use distinct UE beam pairs for uplink and downlink communications with a base station based at least in part on a sounding reference signal (SRS) configuration for the UE; select one or more UE uplink beams for communicating with the base station based at least in part on determining whether to use the distinct UE beam pairs for uplink and downlink communications; and transmit using the one or more UE uplink beams.

In some aspects, a non-transitory computer-readable medium may store one or more instructions for wireless communication. The one or more instructions, when executed by one or more processors of a UE, may cause the one or more processors to determine whether to use distinct UE beam pairs for uplink and downlink communications with a base station based at least in part on a sounding reference signal (SRS) configuration for the UE; select one or more UE uplink beams for communicating with the base station based at least in part on determining whether to use the distinct UE beam pairs for uplink and downlink communications; and transmit using the one or more UE uplink beams.

In some aspects, an apparatus for wireless communication may include means for determining whether to use distinct user equipment (UE) beam pairs for uplink and downlink communications with a base station based at least in part on a sounding reference signal (SRS) configuration for the apparatus; means for selecting one or more UE uplink beams for communicating with the base station based at least in part on determining whether to use the distinct UE beam pairs for uplink and downlink communications; and means for transmitting using the one or more UE uplink beams.

Aspects generally include a method, apparatus, system, computer program product, non-transitory computer-readable medium, user equipment, base station, wireless communication device, and processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIGS. 9-11 are diagrams illustrating examples of uplink beam selection in millimeter wave using a sounding reference signal (SRS) configuration, in accordance with various aspects of the present disclosure.

FIG. 12 is a diagram illustrating an example process performed, for example, by a user equipment, in accordance with various aspects of the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It is noted that while aspects may be described herein using terminology commonly associated with 3G and/or 4G wireless technologies, aspects of the present disclosure can be applied in other generation-based communication systems, such as 5G and later, including NR technologies.

Figure 1:
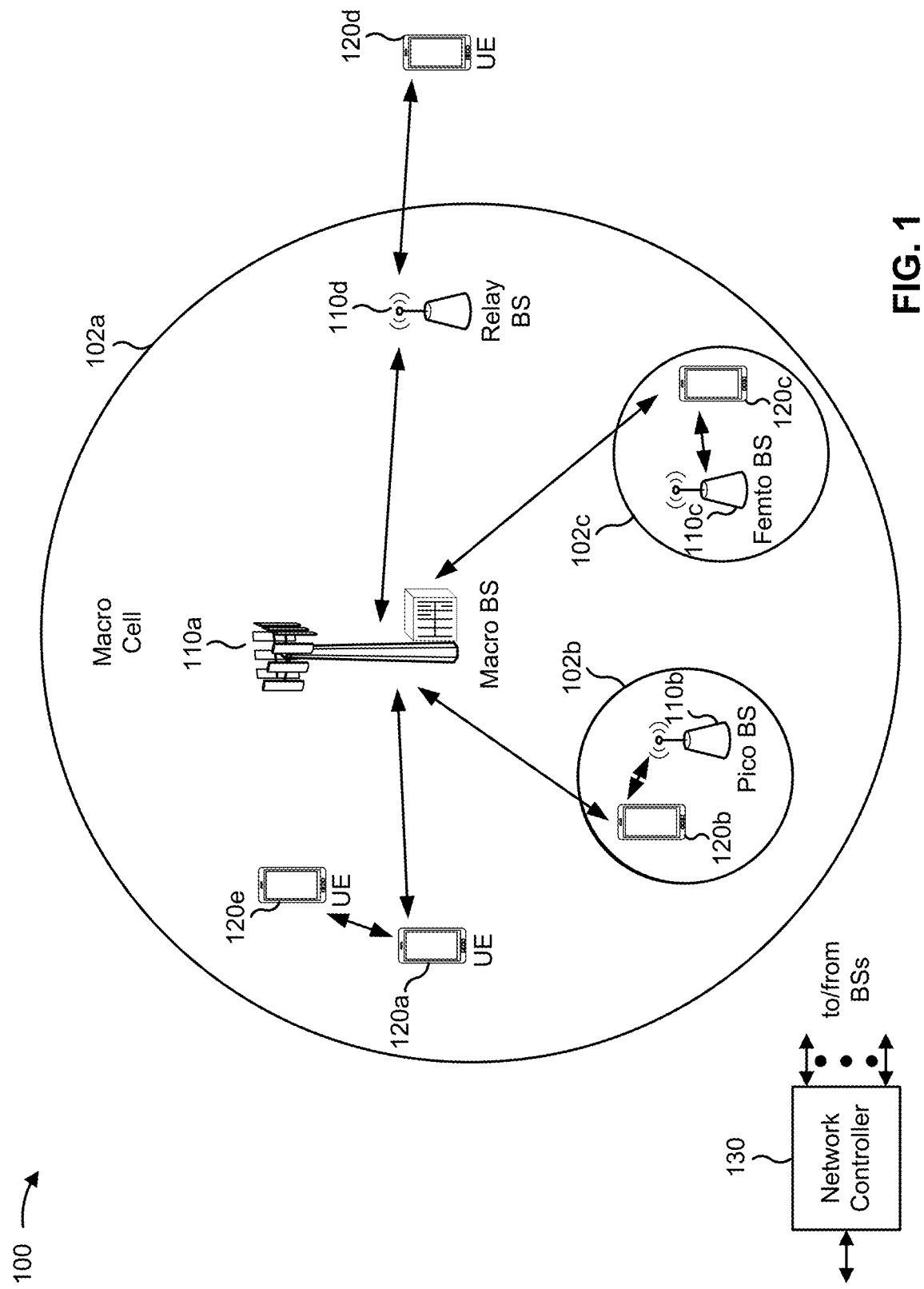
FIG. 1 is a block diagram conceptually illustrating an example of a wireless communication network, in accordance with various aspects of the present disclosure.

FIG. 1 is a diagram illustrating a network 100 in which aspects of the present disclosure may be practiced. The network 100 may be an LTE network or some other wireless network, such as a 5G or NR network. Wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the access network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impact on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, such as sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided merely as an example. Other examples are possible and may differ from what was described with regard to FIG. 1.

Figure 2:
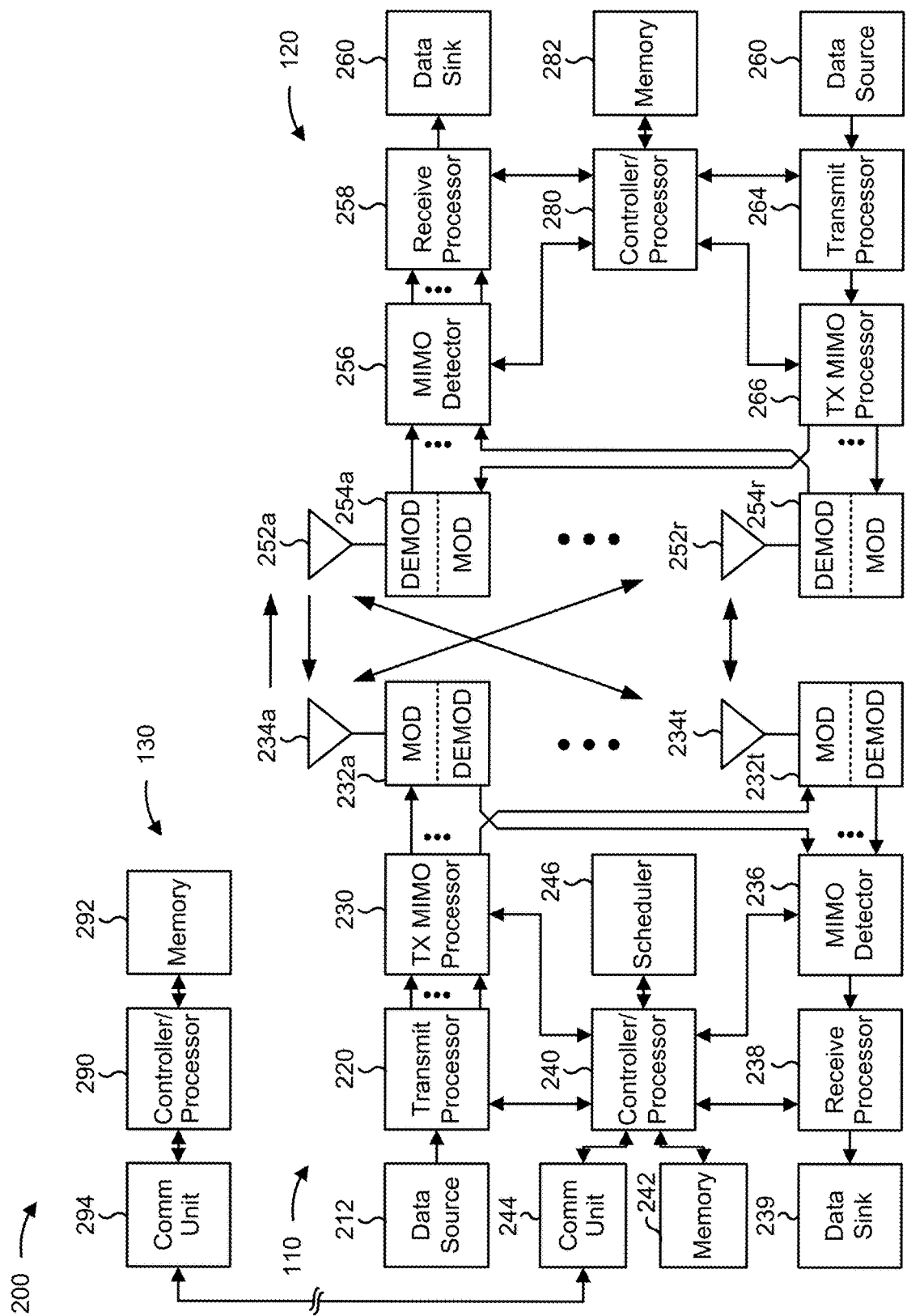
FIG. 2 is a block diagram conceptually illustrating an example of a base station in communication with a user equipment (UE) in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with uplink beam selection in millimeter wave subject to maximum permissible exposure constraints, as described in more detail elsewhere herein. For example, controller/processor 240 of base station 110, controller/processor 280 of UE 120, and/or any other component(s) of FIG. 2 may perform or direct operations of, for example, process 600 of FIG. 6, process 700 of FIG. 7, process 1200 of FIG. 12, and/or other processes as described herein. Memories 242 and 282 may store data and program codes for base station 110 and UE 120, respectively. A scheduler 246 may schedule UEs for data transmission on the downlink and/or uplink.

In some aspects, UE 120 may include means for determining, for a candidate UE uplink beam, a transmit power due to a maximum permissible exposure (MPE) constraint; means for estimating, for the candidate UE uplink beam, a receive power for a base station based at least in part on the transmit power due to the MPE constraint; means for determining a target receive power for the base station; means for selecting the candidate UE uplink beam as an active UE uplink beam based at least in part on the estimated receive power for the base station and the target receive power for the base station; and/or the like. Additionally, or alternatively, UE 120 may include means for determining whether to use distinct UE beam pairs for uplink and downlink communications with a base station based at least in part on a sounding reference signal (SRS) configuration for the UE 120; means for selecting one or more UE uplink beams for communicating with the base station based at least in part on determining whether to use the distinct UE beam pairs for uplink and downlink communications; means for transmitting using the one or more UE uplink beams; and/or the like. In some aspects, such means may include one or more components of UE 120 described in connection with FIG. 2.

In some aspects, base station 110 may include means for selecting an active apparatus downlink beam based at least in part on a first metric reported by a user equipment (UE); means for selecting an active apparatus uplink beam based at least in part on a second metric, wherein the second metric is different from the first metric; means for transmitting an indication of the active apparatus downlink beam and the active apparatus uplink beam to the UE, wherein the active apparatus downlink beam and the active apparatus uplink beam are indicated using different spatial references; and/or the like. In some aspects, such means may include one or more components of base station 110 described in connection with FIG. 2.

As indicated above, FIG. 2 is provided merely as an example. Other examples are possible and may differ from what was described with regard to FIG. 2.

Figure 3:
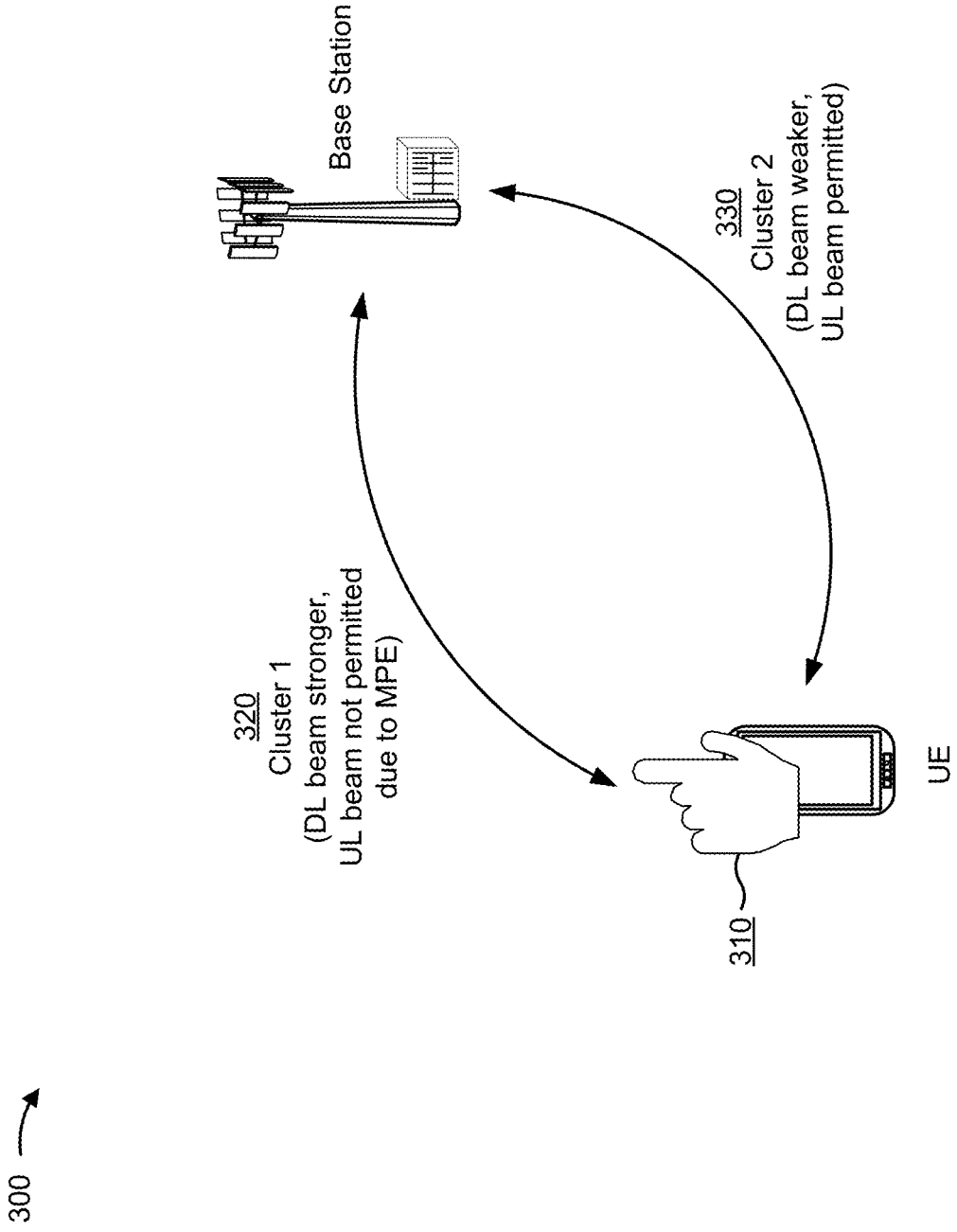
FIGS. 3-5 are diagrams relating to uplink beam selection in millimeter wave subject to maximum permissible exposure constraints, in accordance with various aspects of the present disclosure.

FIG. 3 is a diagram illustrating an example 300 relating to uplink beam selection in millimeter wave subject to maximum permissible exposure constraints.

As shown in FIG. 3, a UE and a base station may be capable of communicating via one or more beams, and a communication via a beam may take multiple different paths, shown as a cluster of paths, to reach a receiver. In some cases, a beam may be a millimeter wave (mmWave) beam that carries a communication in the mmWave frequency band. When transmitting in the mmWave frequency band, a transmitter may use a higher antenna gain as compared to transmitting in the sub-6 gigahertz (GHz) frequency band. As a result, the effective isotropic radiated power (EIRP), which represents the radiated power in a particular direction (e.g., the direction of the beam), may be higher for mmWave communications as compared to sub-6 GHz communications. To improve safety, some governing bodies have placed restrictions on the peak EIRP that can be directed toward the human body. These restrictions are sometimes referred to as maximum permissible exposure (MPE) limitations, MPE constraints, and/or the like.

As shown by reference number 310, in some aspects, an MPE condition may be due to a hand blocking scenario, where a hand of a user of the UE blocks or obstructs communications to and/or from an antenna subarray of the UE, or is otherwise positioned near the antenna subarray. Additionally, or alternatively, the MPE condition may be due to the position of another body part of the user, such as the user's face, head, ear, leg, and/or the like. When the UE is subject to an MPE condition, a downlink beam of a first cluster 320 may be suitable for use by the UE to communicate with the base station, but an uplink beam of the first cluster 320 may not be permitted for use due to the MPE condition.

An uplink beam and a downlink beam in the same cluster (e.g., the first cluster 320) may form a reciprocal beam pair, where the uplink beam is used for transmission at the UE and reception at the base station, and the downlink beam is used for transmission at the base station and reception at the UE. In a reciprocal beam pair, the uplink beam and the downlink beam may be in the same direction or path (e.g., with energy radiating in a particular direction or path more than other directions or paths), but communications on the uplink beam may propagate in the opposite direction as communications on the downlink beam. Further, electrical characteristics of an antenna used to transmit and receive communications via a reciprocal beam pair may be the same, such as gain, radiation pattern, impedance, bandwidth, resonant frequency, polarization, and/or the like, regardless of whether the antenna is transmitting or receiving, due to the reciprocity theorem of electromagnetics. As used herein, a reciprocal beam pair may refer to a beam pair having beam correspondence. Similarly, a non-reciprocal beam pair may refer to a beam pair that does not have beam correspondence.

As indicated above, when the UE is subject to an MPE condition, a downlink beam of a reciprocal beam pair may be suitable for use by the UE to receive communications from the base station, and may have better beam conditions (e.g., a stronger beam) as compared to other downlink beams (e.g., in a different or distinct beam pair), but an uplink beam of the reciprocal beam pair may not be permitted for transmission of communications by the UE due to the MPE condition. For example, the downlink beam may not be subject to an MPE constraint because an EIRP level of a transmission by the base station may subside by the time the transmission reaches the UE and/or the user's hand or other body part. However, the uplink beam may be subject to an MPE constraint because an EIRP level of a transmission by the UE may exceed a permitted EIRP level due to the close proximity of the UE and the user's hand or other body part. This is shown by the first cluster 320.

In such a case, it may be beneficial for the UE and/or the base station to use a first beam for uplink communications and a second beam for downlink communications, where the first beam (e.g., a UE uplink beam or a BS uplink beam) does not form a reciprocal beam pair with the second beam (e.g., a UE downlink beam or a BS downlink beam). In other words, the first beam and the second beam may be included in distinct beam pairs (i.e., different beam pairs). In some aspects, the UE may select non-reciprocal (e.g., distinct, different, and/or the like) UE beams to communicate with the base station even if the base station is using reciprocal BS beams to communicate with the UE. For example, the UE uplink beam may be included in a second cluster 330 and the UE downlink beam may be included in the first cluster 320 (e.g., even if the base station is using a BS uplink beam and a BS downlink beam that are both included in the first cluster 320). The UE uplink beam may form a reciprocal beam pair with a UE downlink beam in the second cluster 330 that is weaker than and/or has less suitable beam conditions than the UE downlink beam in the first cluster 320. By choosing distinct UE uplink and UE downlink beams (e.g., a UE uplink beam and a UE downlink beam from different beam pairs), the UE may improve performance while satisfying an MPE constraint.

Additionally, or alternatively, the base station may select non-reciprocal BS beams, such that a UE uplink beam, used to transmit communications to the base station 110 (e.g., and received at the base station via a BS uplink beam), has a reduced MPE impact at the UE as compared to a BS uplink beam that forms a reciprocal beam pair with the BS downlink beam that has the best or better performance. In some aspects, the UE may report different metrics to facilitate the selection of the BS uplink beam and/or the BS downlink beam. Additional details regarding beam selection are described below.

However, in some cases, a base station may use uplink communications, such as sounding reference signals (SRS) transmitted by the UE, to perform operations for downlink communications. For example, the base station may use SRS to perform downlink channel estimation, to refine a base station downlink beam (e.g., to perform downlink beam management), and/or the like. These operations may be performed with an assumption that the UE is using the same beam pair (e.g., a single beam pair), at a particular time (e.g., a same symbol, a same slot, and/or the like), for a UE uplink beam (e.g., for transmitting uplink communications) and a UE downlink beam (e.g., for receiving downlink communications). When the UE selects distinct beam pairs for a UE uplink beam and a UE downlink beam, this assumption is not true. As a result, downlink performance may suffer due to inaccurate channel estimation, non-optimal beam refinement, and/or the like that use SRS transmitted on a UE uplink beam that does not correspond to (e.g., is non-reciprocal with, is part of a distinct UE beam pair from, and/or the like) a UE downlink beam being used by the UE.

Some techniques and apparatuses described herein permit a UE to infer whether a base station is using SRS, transmitted by the UE, to perform downlink operations, such as downlink channel estimation and/or downlink beam refinement. In some aspects, if the UE infers that the base station is using the SRS for downlink operations, then the UE may determine not to use distinct beam pairs for uplink and downlink communications (e.g., may use the same beam pair for uplink and downlink communications), thereby improving downlink performance (e.g., as compared to selecting distinct UE beam pairs for uplink and downlink) due to more accurate downlink channel estimation, downlink beam refinement, and/or the like. Additionally, or alternatively, if the UE infers that the base station is not using the SRS for downlink operations, then the UE may determine to use distinct beam pairs for uplink and downlink communications, thereby improving performance while satisfying an MPE constraint, as described above. In some aspects, the UE inference may be based at least in part on an SRS configuration, as described in more detail below.

Furthermore, some techniques and apparatuses described herein permit the UE to select one or more beams (e.g., UE uplink beams, UE downlink beams, and/or the like) based at least in part on determining whether to use distinct UE beam pairs for uplink and downlink beam pairs, based at least in part on the SRS configuration, and/or the like. In some aspects, the UE may use different input parameters for beam selection based at least in part on determining whether to use distinct UE beam pairs for uplink and downlink beam pairs, based at least in part on the SRS configuration, and/or the like, resulting in improved performance. For example, better throughput, fewer decoding errors, a better block error rate, and/or the like may be achieved by better channel estimation. This may conserve network resources (e.g., due to selection of an appropriate modulation and coding scheme, due to fewer retransmissions, and/or the like), and/or may conserve resources (e.g., memory resources, processing resources, battery power, and/or the like) of the UE and/or the base station (e.g., due to processing fewer retransmissions and/or the like). In this way, the UE can implement distinct UE beam pairs as appropriate (e.g., depending on an MPE constraint, an SRS configuration, and/or the like) while permitting the base station to correctly perform channel estimation.

As indicated above, FIG. 3 is provided as an example. Other examples are possible and may differ from what was described in connection with FIG. 3.

Figure 4:
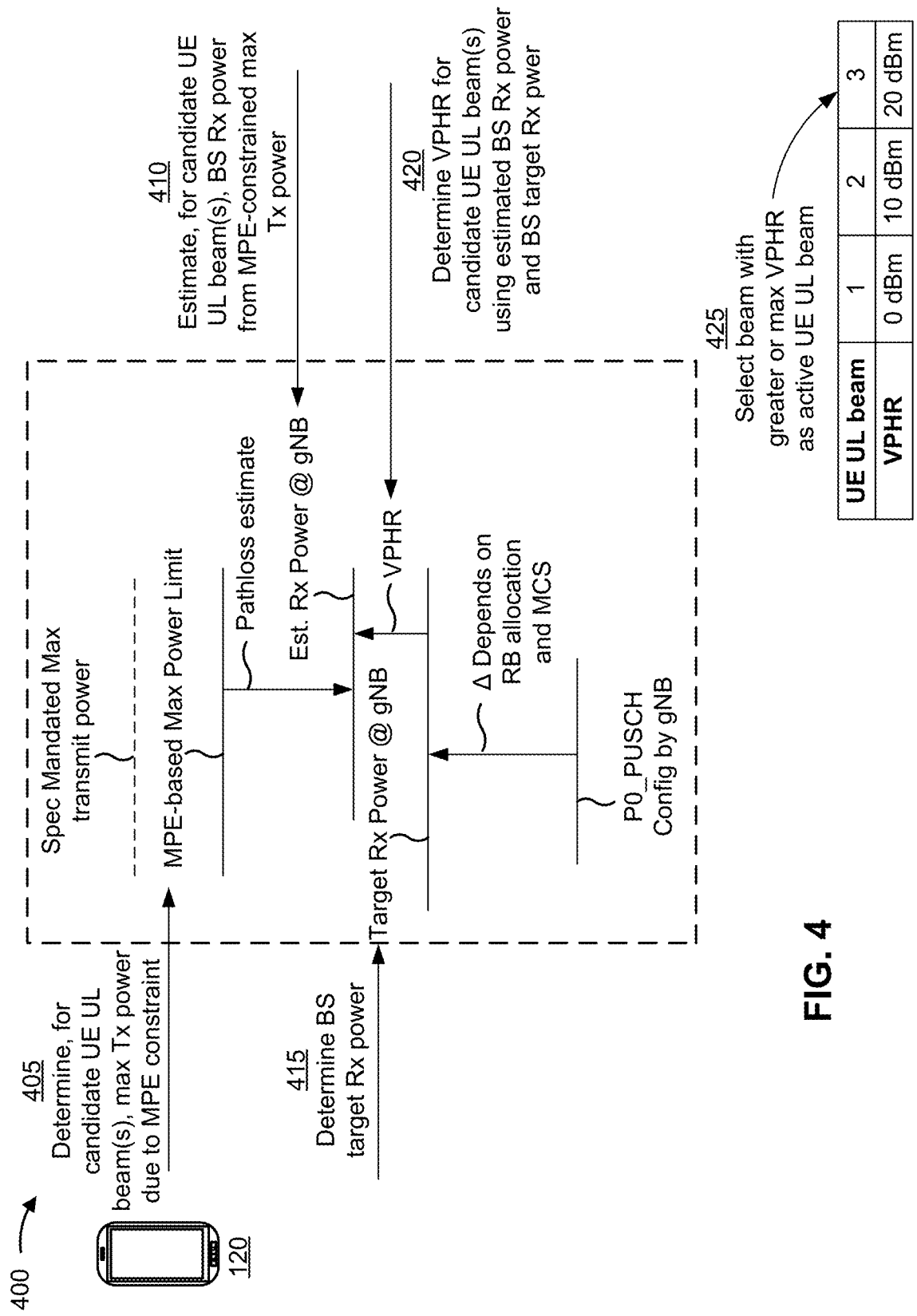

FIG. 4 is a diagram illustrating an example 400 of uplink beam selection in millimeter wave subject to maximum permissible exposure constraints, in accordance with various aspects of the present disclosure.

As shown by reference number 405, a UE 120 may determine, for a candidate UE uplink beam, a transmit power (e.g., a maximum transmit power) due to a maximum permissible exposure (MPE) constraint (e.g., an MPE limitation, an MPE restriction, and/or the like), shown in FIG. 4 as an MPE-based maximum power limit. As used herein, the maximum transmit power due to the MPE constraint may be referred to as an MPE-constrained maximum transmit power. In some aspects, the MPE-constrained maximum transmit power for a candidate UE uplink beam may vary over time due to, for example, movement of the UE 120, rotation of the UE 120, and/or the like. Thus, the UE 120 may determine the MPE-constrained maximum transmit power for a candidate UE uplink beam at a specific time, for a specific time period, and/or the like. Although some operations are described herein as being performed using a maximum transmit power due to an MPE constraint (e.g., an MPE-constrained maximum transmit power), in some aspects, one or more of these operations may be performed using a transmit power due to an WE constraint (e.g., an MPE-constrained transmit power), such as a transmit power that is less than the maximum transmit power due to an WE constraint.

As shown, in some aspects, the MPE-constrained maximum transmit power may be less than a maximum transmit power for the UE 120 when not subject to an WE constraint (e.g., a maximum transmit power due to a class of the UE 120, a specification-mandated maximum transmit power indicated in a wireless communication standard, and/or the like). For example, when the candidate UE uplink beam is subject to an WE constraint (e.g., due to the candidate UE uplink beam being directed toward a body), then the MPE-constrained maximum transmit power for the candidate UE uplink beam may be less than the maximum transmit power for the UE 120. However, in some aspects, the MPE-constrained maximum transmit power may be equal to a maximum transmit power for the UE 120 when not subject to an MPE constraint. For example, when the candidate UE uplink beam is not subject to an MPE constraint (e.g., due to the candidate UE uplink beam not being directed toward a body), then the MPE-constrained maximum transmit power for the candidate UE uplink beam may be equal to the maximum transmit power for the UE 120.

In some aspects, the UE 120 may determine the MPE-constrained maximum transmit power for a candidate UE uplink beam based at least in part on an EIRP value for the candidate UE uplink beam, a maximum or peak EIRP value stored by the UE 120 (e.g., as dictated by a governing body, as specified in a wireless communication standard, as configured for the UE 120, and/or the like), a determination of whether the candidate UE uplink beam is directed toward a body (e.g., a human body), and/or the like. For example, if the candidate UE uplink beam is not directed toward a body, then the UE 120 may set the MPE-constrained maximum transmit power to a maximum transmit power value for the UE 120, which may be stored by the UE 120, may be determined based at least in part on a class of the UE 120, may be specified by a wireless communication standard, and/or the like. However, if the candidate UE uplink beam is directed toward a body, then the UE 120 may set the MPE-constrained maximum transmit power based at least in part on a determined EIRP value for the candidate UE uplink beam and/or a maximum permitted EIRP value.

As shown by reference number 410, the UE 120 may estimate, for the candidate UE uplink beam, a receive power for a base station (e.g., an estimated BS receive power) based at least in part on the WE-constrained maximum transmit power. In some aspects, the UE 120 may estimate the BS receive power using the MPE-constrained maximum transmit power, a pathloss estimate (e.g., for transmissions from the UE 120 to the base station 110), and/or the like. In some aspects, the UE 120 may estimate the pathloss after accounting for antenna array gains for the UE 120 and/or the base station 110 with respect to the candidate UE uplink beam, after accounting for beamforming for the candidate UE uplink beam, and/or the like.

As shown by reference number 415, the UE 120 may determine a target receive power for the base station (e.g., a target BS receive power). In some aspects, the UE 120 may determine the target BS receive power based at least in part on one or more parameters configured by the base station 110 and/or indicated to the UE 120 by the base station 110. For example, the UE 120 may determine the target BS receive power based at least in part on a configured power parameter per resource block (e.g., shown as a P0_PUSCH parameter), a resource block allocation, a scaling factor associated with the resource block allocation (e.g., a scaling factor that depends on an uplink grant size), a modulation and coding scheme (MCS), a scaling factor associated with the MCS (e.g., a higher power for a higher MCS, a lower power for a lower MCS, and/or the like), and/or the like. In some aspects, the UE 120 may determine the target BS receive power based at least in part on an equation stored by the UE 120 and/or specified by a wireless communication standard.

As shown by reference number 420, the UE 120 may determine a virtual power headroom (VPHR) value for the candidate UE uplink beam. In some aspects, the VPHR value may be determined based at least in part on the estimated receive power for the base station (e.g., the estimated BS receive power) and the target receive power for the base station (e.g., the target BS receive power). For example, the VPHR may be calculated as the difference between estimated receive power for the base station and the target receive power for the base station (e.g., the estimated BS receive power minus the target BS receive power). In some aspects, the difference between the estimated BS receive power and the target BS receive power may be determined by filtering multiple samples (e.g., estimates, targets, and/or the like) over a time period.

Stated another way, the VPHR may be based at least in part on the WE-constrained maximum transmit power, a pathloss estimate, and the target BS receive power (e.g., the WE-constrained maximum transmit power minus the pathloss estimate minus the target BS receive power). In some aspects, the VPHR may be represented in units of decibels per milliwatt (e.g., decibel-milliwatts, or dBm).

As shown by reference number 425, the UE 120 may select a candidate UE uplink beam, from a plurality of candidate UE uplink beams, based at least in part on respective VPHR values determined for each of the plurality of candidate UE uplink beams. The selected candidate UE uplink beam may be used by the UE 120, as an active UE uplink beam, to communicate with the base station 110 (e.g., to transmit information on one or more channels, such as a physical uplink control channel (PUCCH), a physical uplink shared channel (PUSCH), a random access channel (RACH), and/or the like). In some aspects, the UE 120 may select the candidate UE uplink beam that has the maximum VPHR value as compared to VPHR values of other candidate UE uplink beams (e.g., all other candidate UE uplink beams). Stated another way, the UE 120 may select the candidate UE uplink beam that has the maximum difference between an estimated BS receive power and a target BS receive power as compared to the respective differences determined for other candidate UE uplink beams (e.g., all other candidate UE uplink beams).

For example, in FIG. 4, candidate UE uplink beam 1 is shown as having a VPHR value of 0 dBm, candidate UE uplink beam 2 is shown as having a VPHR value of 10 dBm, and candidate UE uplink beam 3 is shown as having a VPHR value of 20 dBm. In this case, the UE 120 may select candidate UE uplink beam 3 as the active UE uplink beam to be used to transmit communications to the base station 110 (e.g., regardless of whether the selected candidate UE uplink beam corresponds to a BS uplink beam being used by the BS to receive communications from the UE 120). In this way, the UE 120 may take MPE constraints into account when selecting the candidate UE uplink beam as the active UE uplink beam, thereby selecting the best candidate UE uplink beam that satisfies safety requirements. Furthermore, the UE 120 may be capable of maintaining a link for uplink communications despite a scenario with a severe MPE constraint.

In some aspects, the UE 120 may account for hysteresis scenarios and/or may prevent or reduce hysteresis when selecting the active UE uplink beam. For example, the UE 120 may select a candidate UE uplink beam as the active UE uplink beam based at least in part on a determination that the candidate UE uplink beam has the maximum VPHR value (and/or a maximum difference between an estimated BS receive power and a target BS receive power) for a threshold amount of time. Additionally, or alternatively, the UE 120 may wait for a threshold amount of time to elapse after selecting a candidate UE uplink beam as the active UE uplink beam before performing another selection. These techniques may account for time hysteresis and may conserve resources (e.g., computing resources, processing resources, memory resources, network resources, and/or the like) that would otherwise be wasted by switching back and forth between beams.

Additionally, or alternatively, the UE 120 may select a candidate UE uplink beam as the active UE uplink beam based at least in part on a determination that the maximum VPHR value (and/or a maximum difference between an estimated BS receive power and a target BS receive power) of the candidate UE uplink beam is greater than other VPHR values (or other differences) determined for the other candidate UE uplink beams by a threshold amount (e.g., is greater than the second highest VPHR value and/or the second highest difference by the threshold amount). This may account for power hysteresis and may conserve resources, as described above.

Additionally, or alternatively, the UE 120 may compare a candidate UE uplink beam (e.g., a first candidate UE uplink beam) to another candidate UE uplink beam (e.g., a second candidate UE uplink beam), such as a current active UE uplink beam and/or one or more other candidate UE uplink beams. In this case, the UE 120 may select the first candidate UE uplink beam over the second candidate UE uplink beam based at least in part on comparing VPHR values for those beams, comparing a difference between estimated BS receive power and the target BS receive power for those beams, and/or the like. For example, the UE 120 may select the first candidate UE uplink beam over the second candidate UE uplink beam based at least in part on a determination that the first candidate UE uplink beam has a greater VPHR value than that of the second candidate UE uplink beam (e.g., by a threshold amount, for a threshold time period, and/or the like), has a greater difference between an estimated BS receive power and a target BS receive power than that of the second candidate UE uplink beam (e.g., by a threshold amount, for a threshold time period, and/or the like), and/or the like.

As described above in connection with FIG. 3, in some aspects, the candidate UE uplink beam selected as the active UE uplink beam may not be reciprocal with (e.g., may not form a reciprocal beam pair with) an active UE downlink beam being used by the UE 120 to receive downlink communications from the base station 110. For example, the active UE uplink beam may not be in a same direction or path (or may not be in opposite directions or paths) as the active UE downlink beam. Additionally, or alternatively, the active UE uplink beam may radiate energy (e.g., a majority of radiated energy) in a different direction or path than the active UE downlink beam. Additionally, or alternatively, electrical characteristics of an antenna used to transmit communications on the active UE uplink beam may be different from electrical characteristics used to receive communications on the active UE downlink beam. Such electrical characteristics may include one or more of a gain, a radiation pattern, an impedance, a bandwidth, a resonant frequency, a polarization, and/or the like.

In some aspects, the UE 120 may determine not to use a distinct pair of beams for the active UE uplink beam and the active UE downlink beam (e.g., may determine not to use a non-reciprocal beam pair, or may determine to use a reciprocal beam pair). For example, if the base station 110 uses uplink communications from the UE 120 for downlink estimates (e.g., other than sounding reference signals (SRS) designed for such a use), then such downlink estimates may be less accurate if the UE 120 does not use a reciprocal beam pair. Thus, the UE 120 may determine that the UE 120 is not permitted to use a distinct pair of beams based at least in part on a determination that the base station 110 uses uplink communications from the UE 120 for downlink estimation, and the UE 120 may determine not to use a distinct pair of beams in this scenario. In this way, the accuracy of the downlink estimates of the base station 110 may be improved or maintained.

Conversely, the UE 120 may determine that the UE 120 is permitted to use a distinct pair of beams based at least in part on a determination that the base station 110 is not configured to use uplink communications from the UE 120 for downlink estimation (e.g., other than SRS specifically designed for such use, such as SRS for downlink channel state information (CSI) acquisition, non-codebook SRS, and/or the like). In this case, the UE 120 may determine to use a distinct pair of beams (e.g., if a candidate UE uplink beam, selected as the active UE uplink beam using the techniques described herein, is distinct from the active UE downlink beam). Thus, the UE 120 may perform one or more operations described herein (e.g., in connection with reference numbers 405-425, in connection with process 600 of FIG. 6, and/or the like) based at least in part on a determination that the base station is not configured to use uplink communications for downlink estimation. In this way, the accuracy of the downlink estimates of the base station 110 may be maintained, while permitting selection of the best UE uplink beam that does not violate an MPE constraint.

For example, the UE 120 may determine to select a candidate UE uplink beam, that is not reciprocal with the active downlink beam, based at least in part on a sound reference signal (SRS) configuration for the UE. In some aspects, the UE 120 may determine to select a candidate UE uplink beam, that is not reciprocal with the active downlink beam, based at least in part on a number of SRS resource sets configured for one or more SRS usages, whether an SRS resource is included in multiple SRS resource sets associated with different SRS usages, a time domain configuration indicated by the SRS configuration, a periodicity indicated by the SRS configuration, a spatial reference configuration indicated by the SRS configuration, a determination that SRS resources are not configured for an antenna switching usage and/or a codebook usage, a determination that SRS resources for at least one of an antenna switching usage or a codebook usage are configured with a periodicity that satisfies a threshold, a determination that a first SRS resource set is configured with an antenna switching usage and a second SRS resource set is configured with a codebook usage, and/or the like.

Using the techniques described herein, UE uplink beam selection may depend on a different metric and/or value than UE downlink beam selection. For example, UE uplink beam selection may use VPHR values, while UE downlink beam selection may not. For example, UE downlink beam selection may use a signal to interference plus noise (SINR) value, a reference signal received power (RSRP) value, a spectral efficiency (SPEFF) value, and/or the like.

As indicated above, FIG. 4 is provided as an example. Other examples are possible and may differ from what was described with respect to FIG. 4.

Figure 5:
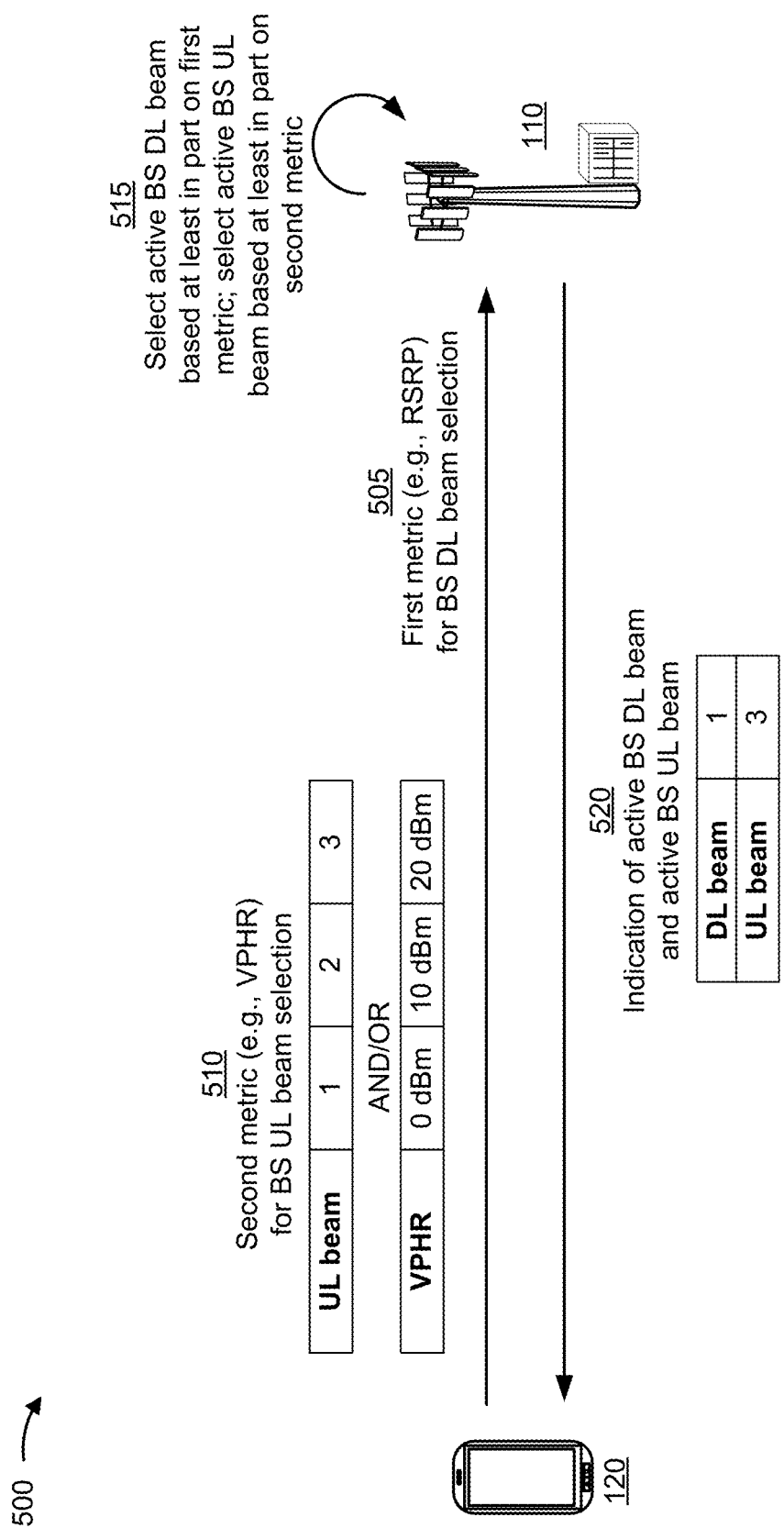

FIG. 5 is a diagram illustrating another example 500 of uplink beam selection in millimeter wave subject to maximum permissible exposure constraints, in accordance with various aspects of the present disclosure.

As shown by reference number 505, a UE 120 may report, and a base station 110 may receive, a first metric to be used to select a base station (BS) downlink beam. For example, the first metric may include a reference signal received power (RSRP) value and/or the like.

As shown by reference number 510, the UE 120 may report, and the base station 110 may receive, a second metric to be used to select a BS uplink beam. In some aspects, the second metric may be different from the first metric. For example, the second metric may not be an RSRP value. For example, the second metric may include a VPHR value, as described above in more detail in connection with FIG. 4. Additionally, or alternatively, the second metric may include and/or may be determined based at least in part on a maximum transmit power for the UE due to an MPE constraint (e.g., an MPE-constrained maximum transmit power), a pathloss estimate for the base station and the UE, an estimated receive power for the base station, a target receive power for the base station, and/or the like, as described in more detail above in connection with FIG. 4.

In some aspects, the UE 120 may report the value of the second metric for one or more uplink beams. Additionally, or alternatively, the UE 120 may report an indication of one or more uplink beams identified based at least in part on the second metric. For example, and as shown, the UE 120 may report information that identifies multiple uplink beams, shown as beams 1, 2, and 3. In some aspects, the UE 120 may determine these beams using the second metric, such as VPHR and/or the like, as described above in connection with FIG. 4. In some aspects, the UE 120 may rank the uplink beams and/or report a beam ranking, which may be used by the base station 110 to select an active BS uplink beam.

Additionally, or alternatively, the UE 120 may report multiple values, corresponding to multiple uplink beams, using the second metric. For example, and as shown, the UE 120 may report an indication of a VPHR value of 0 dBm for beam 1, 10 dBm for beam 2, and 20 dBm for beam 3. In some aspects, the base station 110 may use the multiple values of the second metric, corresponding to the multiple uplink beams, to select an active BS uplink beam.

In some aspects, the UE 120 may periodically report values of the second metric and/or uplink beams determined based at least in part on those values. In some aspects, the periodicity for such reporting may be configured by the base station 110 (e.g., in an RRC configuration message, a MAC-CE, DCI, and/or the like). Additionally, or alternatively, the base station 110 may transmit a request for the UE 120 to report such values and/or uplink beams (e.g., aperiodically), and the UE 120 may report such values and/or uplink beams based at least in part on the request. Additionally, or alternatively, the UE 120 may report such values and/or uplink beams based at least in part on a determination, by the UE, that a reporting condition is satisfied. The reporting condition may include, for example, a change to an MPE constraint at the UE (e.g., by a threshold amount, for a threshold number of uplink beams, and/or the like), a change to a UE-specific constraint (e.g., by a threshold amount), a change to an environmental constraint associated with the UE 120 (e.g., by a threshold amount), and/or the like. The UE-specific constraint may include, for example, a thermal constraint (e.g., regarding a temperature measured by the UE 120), a power consumption constraint, and/or the like.

As shown by reference number 515, the base station 110 may select an active BS downlink beam based at least in part on the first metric. Additionally, or alternatively, the base station 110 may select an active BS uplink beam based at least in part on the second metric. In some aspects, the active BS downlink beam and the active BS uplink beam do not form a reciprocal beam pair.

In some aspects, the base station 110 may select the active BS uplink beam from multiple candidate uplink beams reported by the UE 120. For example, the base station 110 may select the active BS uplink beam with the best beam conditions at the base station 110 and/or with the best reported metric value (e.g., of the second metric). Additionally, or alternatively, the base station 110 may select the active BS uplink beam based at least in part on values of second metrics reported by the UE 120. In some aspects, the base station 110 may use one or more metrics reported by the UE 120 and/or one or more candidate uplink beams reported by the UE 120 in combination with one or more factors determined by the base station 110, such as a measurement associated with the candidate uplink beams, a traffic profile associated with the base station 110, a beam capability associated with the base station 110, and/or the like.

As shown by reference number 520, the base station 110 may transmit, and the UE 120 may receive, an indication of the active BS downlink beam and the active BS uplink beam. In some aspects, the active BS downlink beam and the active BS uplink beam may be indicated using different spatial references. The different spatial references may be for a non-reciprocal beam pair, such as a quasi co-location (QCL) reference or a transmission configuration indicator (TCI) state for the active BS downlink beam, and a spatial reference for the active BS uplink beam that does not share reciprocity with the QCL reference or the TCI state. In some aspects, the indication may be transmitted in an RRC message, DCI, a MAC-CE, and/or the like. The base station 110 and the UE 120 may communicate using the active BS downlink beam and/or the active BS uplink beam.

As described above, in some aspects, the active BS downlink beam and the active BS uplink beam do not form a reciprocal beam pair. For example, as shown, the base station 110 may select and/or indicate downlink beam 1 (e.g., which forms a reciprocal beam pair with uplink beam 1) and uplink beam 3 (e.g., which forms a reciprocal beam pair with downlink beam 3). By selecting non-reciprocal BS beams, the base station 110 may be capable of selecting a BS downlink beam (e.g., an optimal BS downlink beam) and a non-reciprocal BS uplink beam corresponding to a UE uplink beam that has a reduced MPE impact at the UE 120 as compared to a UE uplink beam corresponding to a BS uplink beam that forms a reciprocal beam pair with the BS downlink beam. In this way, MPE constraints may be satisfied while still permitting good network performance.

As indicated above, FIG. 5 is provided as an example. Other examples are possible and may differ from what was described with respect to FIG. 5.

Figure 6:
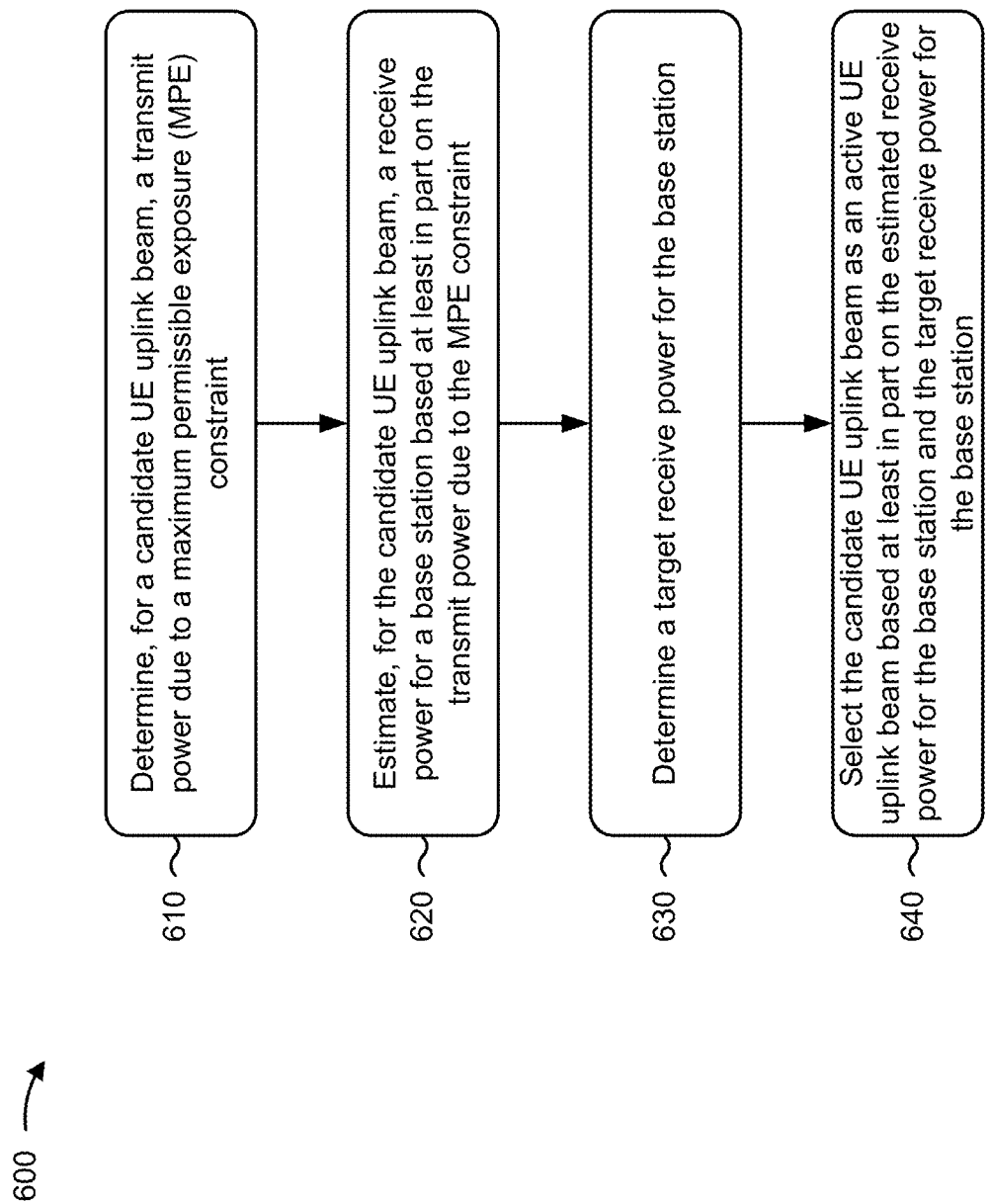
FIGS. 6-7 are diagrams illustrating example processes relating to uplink beam selection in millimeter wave subject to maximum permissible exposure constraints, in accordance with various aspects of the present disclosure.

FIG. 6 is a diagram illustrating an example process 600 performed, for example, by a UE, in accordance with various aspects of the present disclosure. Example process 600 is an example where a UE (e.g., UE 120 and/or the like) performs operations associated with uplink beam selection in millimeter wave subject to maximum permissible exposure constraints.

As shown in FIG. 6, in some aspects, process 600 may include determining, for a candidate UE uplink beam, a transmit power due to a maximum permissible exposure (MPE) constraint (block 610). For example, the UE (e.g., using controller/processor 280 and/or the like) may determine, for a candidate UE uplink beam, a transmit power (e.g., a maximum transmit power) due to an MPE constraint, as described above in connection with FIGS. 3-4.

As further shown in FIG. 6, in some aspects, process 600 may include estimating, for the candidate UE uplink beam, a receive power for a base station based at least in part on the transmit power due to the MPE constraint (block 620). For example, the UE (e.g., using controller/processor 280 and/or the like) may estimate, for the candidate UE uplink beam, a receive power for a base station based at least in part on the transmit power due to the MPE constraint, as described above in connection with FIGS. 3-4.

As further shown in FIG. 6, in some aspects, process 600 may include determining a target receive power for the base station (block 630). For example, the UE (e.g., using controller/processor 280 and/or the like) may determine a target receive power for the base station, as described above in connection with FIGS. 3-4.

As further shown in FIG. 6, in some aspects, process 600 may include selecting the candidate UE uplink beam as an active UE uplink beam based at least in part on the estimated receive power for the base station and the target receive power for the base station (block 640). For example, the UE (e.g., using controller/processor 280 and/or the like) may select the candidate UE uplink beam as an active UE uplink beam based at least in part on the estimated receive power for the base station and the target receive power for the base station, as described above in connection with FIGS. 3-4.

Process 600 may include additional aspects, such as any single aspect or any combination of aspects described below and/or in connection with one or more other processes described elsewhere herein.

In a first aspect, the candidate UE uplink beam is selected as the active UE uplink beam based at least in part on a virtual power headroom value that represents a difference between the estimated receive power for the base station and the target receive power for the base station.

In a second aspect, alone or in combination with the first aspect, the difference is determined based at least in part on multiple samples filtered over a time period.

In a third aspect, alone or in combination with one or more of the first and second aspects, the candidate UE uplink beam is selected as the active UE uplink beam based at least in part on a determination that the candidate UE uplink beam has a maximum virtual power headroom value as compared to other candidate UE uplink beams.

In a fourth aspect, alone or in combination with one or more of the first through third aspects, the candidate UE uplink beam is selected as the active UE uplink beam based at least in part on at least one of: a determination that the candidate UE uplink beam has the maximum virtual power headroom value for a threshold amount of time, a determination that the maximum virtual power headroom value satisfies a threshold as compared to virtual power headroom values of the other candidate UE uplink beams, or a combination thereof.

In a fifth aspect, alone or in combination with one or more of the first through fourth aspects, the candidate UE uplink beam is selected as the active UE uplink beam over another candidate UE uplink beam based at least in part on a determination that the candidate UE uplink beam has a greater virtual power headroom value as compared to the other candidate UE uplink beam.

In a sixth aspect, alone or in combination with one or more of the first through fifth aspects, the candidate UE uplink beam is selected as the active UE uplink beam based at least in part on at least one of: a determination that the candidate UE uplink beam has the greater virtual power headroom value for a threshold amount of time, a determination that the virtual power headroom value for the candidate UE uplink beam is greater than that of the other candidate UE uplink beam by a threshold amount, or a combination thereof.

In a seventh aspect, alone or in combination with one or more of the first through sixth aspects, the candidate UE uplink beam is selected as the active UE uplink beam based at least in part on a determination that the candidate UE uplink beam has a maximum difference between the estimated receive power and the target receive power as compared to other candidate UE uplink beams.

In an eighth aspect, alone or in combination with one or more of the first through seventh aspects, the candidate UE uplink beam is selected as the active UE uplink beam based at least in part on at least one of: a determination that the candidate UE uplink beam has the maximum difference for a threshold amount of time, a determination that the candidate UE uplink beam has the maximum difference by a threshold amount, or a combination thereof.

In a ninth aspect, alone or in combination with one or more of the first through eighth aspects, the candidate UE uplink beam is selected as the active UE uplink beam over another candidate UE uplink beam based at least in part on a determination that the candidate UE uplink beam has a greater difference between the estimated receive power and the target receive power as compared to the other candidate UE uplink beam.

In a tenth aspect, alone or in combination with one or more of the first through ninth aspects, the candidate UE uplink beam is selected as the active UE uplink beam based at least in part on at least one of: a determination that the candidate UE uplink beam has the greater difference for a threshold amount of time, a determination that the candidate UE uplink beam has the greater difference by a threshold amount, or a combination thereof.

In an eleventh aspect, alone or in combination with one or more of the first through tenth aspects, the estimated receive power for the base station is determined based at least in part on a pathloss estimate.

In a twelfth aspect, alone or in combination with one or more of the first through eleventh aspects, the target receive power for the base station is determined based at least in part on at least one of a configured power parameter per resource block, a scaling factor for uplink grant size, or a scaling factor for modulation and coding scheme.

In a thirteenth aspect, alone or in combination with one or more of the first through twelfth aspects, the virtual power headroom value is reported to the base station.

In a fourteenth aspect, alone or in combination with one or more of the first through thirteenth aspects, the candidate UE uplink beam is not reciprocal with an active downlink beam for the UE.

In a fifteenth aspect, alone or in combination with one or more of the first through fourteenth aspects, process 600 includes determining to select the candidate UE uplink beam, that is not reciprocal with the active downlink beam, based at least in part on a sound reference signal (SRS) configuration for the UE.

In a sixteenth aspect, alone or in combination with one or more of the first through fifteenth aspects, process 600 includes determining to select the candidate UE uplink beam, that is not reciprocal with the active downlink beam, based at least in part on at least one of: a number of SRS resource sets configured for one or more SRS usages, whether an SRS resource is included in multiple SRS resource sets associated with different SRS usages, a time domain configuration indicated by the SRS configuration, a periodicity indicated by the SRS configuration, a spatial reference configuration indicated by the SRS configuration, a determination that SRS resources are not configured for an antenna switching usage, a codebook usage, or a combination thereof, a determination that SRS resources for at least one of an antenna switching usage or a codebook usage are configured with a periodicity that satisfies a threshold, a determination that a first SRS resource set is configured with an antenna switching usage and a second SRS resource set is configured with a codebook usage, or a combination thereof.

In a seventeenth aspect, alone or in combination with one or more of the first through sixteenth aspects, the candidate UE uplink beam is selected as the active UE uplink beam based at least in part on a determination that the base station is not configured to use uplink communications for downlink estimation.

In an eighteenth aspect, alone or in combination with one or more of the first through seventeenth aspects, the candidate UE uplink beam is selected as the active UE uplink beam based at least in part on a different metric than is used for UE downlink beam selection.

In a nineteenth aspect, alone or in combination with one or more of the first through eighteenth aspects, the active UE uplink beam is used to communicate with the base station via one or more antennas of the UE.

In a twentieth aspect, alone or in combination with one or more of the first through nineteenth aspects, process 600 includes receiving an indication of an active BS downlink beam and an active BS uplink beam from the base station, wherein the active BS downlink beam and the active BS uplink beam are indicated using different spatial references.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
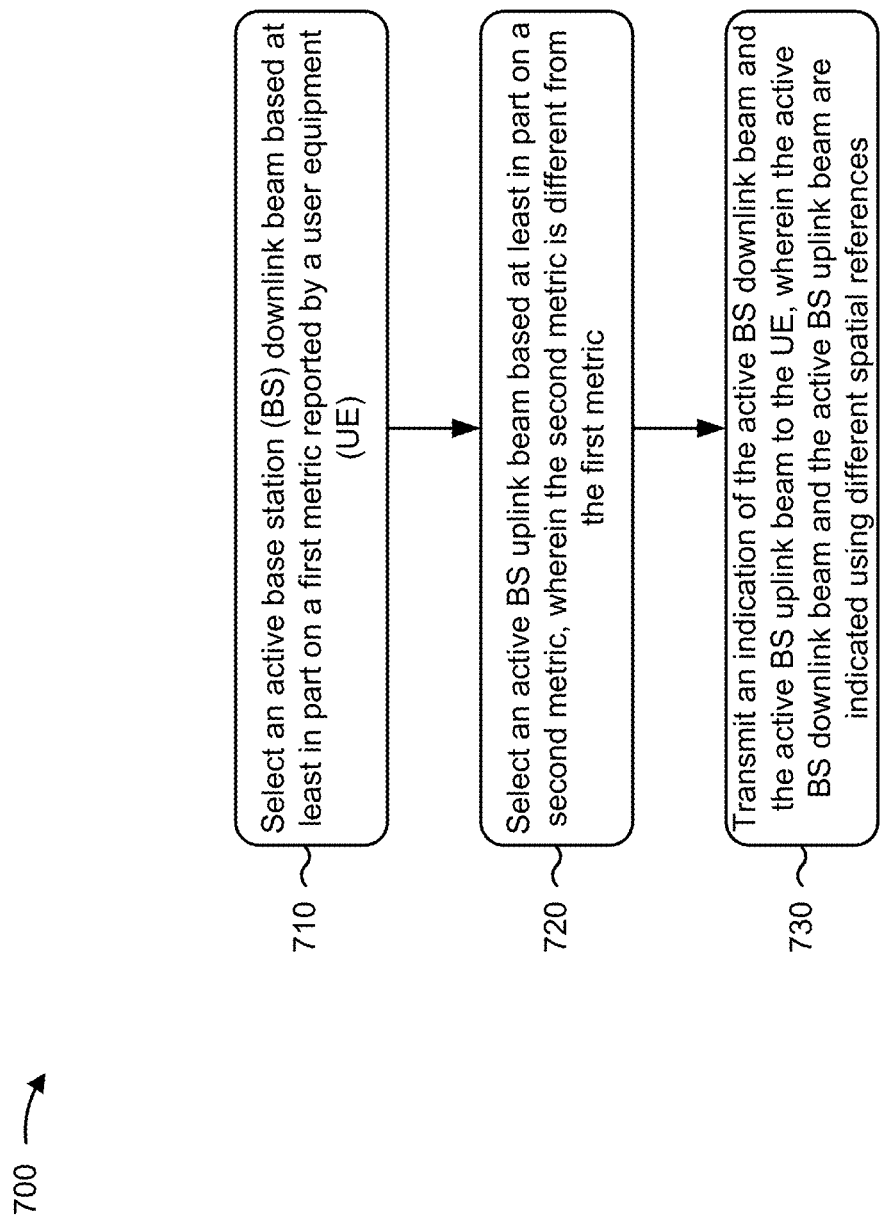

FIG. 7 is a diagram illustrating an example process 700 performed, for example, by a base station, in accordance with various aspects of the present disclosure. Example process 700 is an example where a base station (e.g., base station 110 and/or the like) performs operations associated with uplink beam selection in millimeter wave subject to maximum permissible exposure constraints.

As shown in FIG. 7, in some aspects, process 700 may include selecting an active base station (BS) downlink beam based at least in part on a first metric reported by a user equipment (UE) (block 710). For example, the base station (e.g., using controller/processor 240 and/or the like) may select an active BS downlink beam based at least in part on a first metric reported by a UE, as described above in connection with FIG. 5.

As further shown in FIG. 7, in some aspects, process 700 may include selecting an active BS uplink beam based at least in part on a second metric, wherein the second metric is different from the first metric (block 720). For example, the base station (e.g., using controller/processor 240 and/or the like) may select an active BS uplink beam based at least in part on a second metric, as described above in connection with FIG. 5. In some aspects, the second metric is different from the first metric.

As further shown in FIG. 7, in some aspects, process 700 may include transmitting an indication of the active BS downlink beam and the active BS uplink beam to the UE, wherein the active BS downlink beam and the active BS uplink beam are indicated using different spatial references (block 730). For example, the base station (e.g., using controller/processor 240, transmit processor 220, TX MIMO processor 230, MOD 232, antenna 234, and/or the like) may transmit an indication of the active BS downlink beam and the active BS uplink beam to the UE, as described above in connection with FIG. 5. In some aspects, the active BS downlink beam and the active BS uplink beam are indicated using different spatial references.

Process 700 may include additional aspects, such as any single aspect or any combination of aspects described below and/or in connection with one or more other processes described elsewhere herein.

In a first aspect, the active BS downlink beam and the active BS uplink beam do not form a reciprocal beam pair.

In a second aspect, alone or in combination with the first aspect, the first metric is a reference signal receive power (RSRP) value.

In a third aspect, alone or in combination with one or more of the first and second aspects, the second metric is a virtual power headroom value that represents a difference between an estimated receive power for the base station and a target receive power for the base station.

In a fourth aspect, alone or in combination with one or more of the first through third aspects, the second metric includes or is based at least in part on at least one of: a transmit power (e.g., a maximum transmit power) for the UE due to a maximum permissible exposure (MPE) constraint, a pathloss estimate for the base station and the UE, an estimated receive power for the base station, a target receive power for the base station, or a combination thereof.

In a fifth aspect, alone or in combination with one or more of the first through fourth aspects, the active BS uplink beam is selected based at least in part on a plurality of second metrics, corresponding to a plurality of candidate uplink beams, reported to the base station by the UE.

In a sixth aspect, alone or in combination with one or more of the first through fifth aspects, the active BS uplink beam is selected from a plurality of candidate uplink beams, corresponding to a plurality of second metrics, reported to the base station by the UE.

In a seventh aspect, alone or in combination with one or more of the first through sixth aspects, the second metric is reported to the base station by the UE.

In an eighth aspect, alone or in combination with one or more of the first through seventh aspects, the second metric is reported based at least in part on at least one of: a configured periodicity, a request from the base station, a determination that a reporting condition is satisfied, or a combination thereof.

In a ninth aspect, alone or in combination with one or more of the first through eighth aspects, the reporting condition includes at least one of: a change to a maximum permissible exposure (MPE) constraint at the UE, a change to a UE-specific constraint, a change to an environmental constraint associated with the UE, or a combination thereof.

In a tenth aspect, alone or in combination with one or more of the first through ninth aspects, the indication is transmitted in at least one of: a radio resource control (RRC) message, downlink control information, a media access control (MAC) control element (CE), or a combination thereof.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
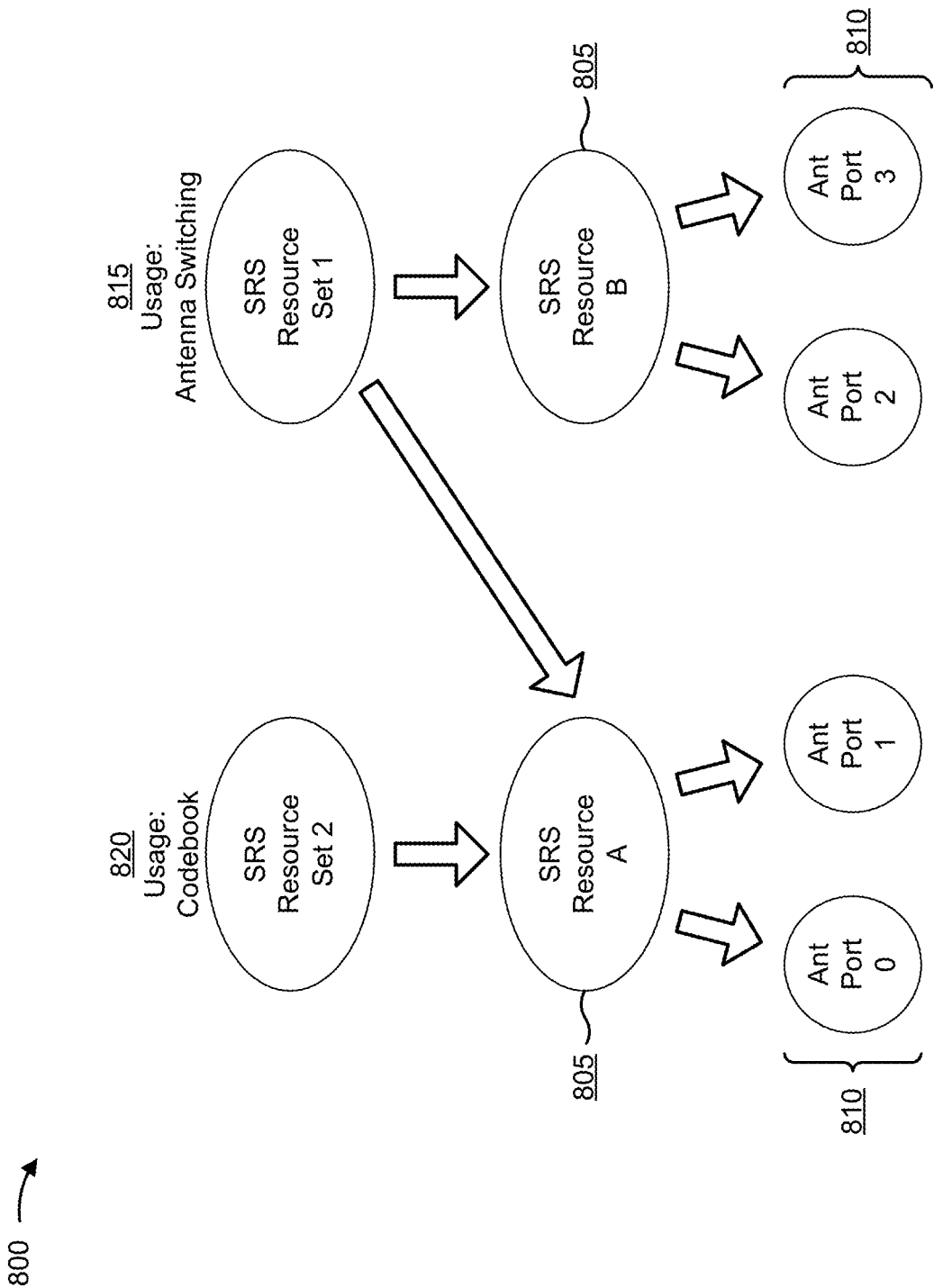
FIG. 8 is a diagram illustrating an example of sounding reference signal (SRS) resource sets, in accordance with various aspects of the present disclosure.

FIG. 8 is a diagram illustrating an example 800 of sounding reference signal (SRS) resource sets, in accordance with various aspects of the present disclosure.

A base station 110 may configure a UE 120 with one or more SRS resource sets to allocate resources for SRS transmissions by the UE 120. For example, a configuration for SRS resource sets may be indicated in an SRS configuration (sometimes referred to as an SRS resource configuration, an SRS resource set configuration, and/or the like). In some aspects, the SRS configuration may be indicated in a radio resource control (RRC) message (e.g., an RRC configuration message, and RRC reconfiguration message, and/or the like). As shown by reference number 805, an SRS configuration may indicate one or more resources (e.g., shown as SRS resources) that are included in an SRS resource set. The resources may include time resources, frequency resources, spatial resources, and/or the like (e.g., a slot, a symbol, a resource block, a periodicity for the time resources, a beam, a spatial reference, and/or the like).

As shown by reference number 810, an SRS configuration may indicate one or more antenna ports via which an SRS is to be transmitted in an SRS resource (e.g., in a time-frequency resource, a spatial resource, and/or the like). Thus, an SRS configuration for an SRS resource set may indicate one or more resources in which an SRS is to be transmitted, and may indicate one or more antenna ports on which the SRS is to be transmitted in those resources. In some aspects, the SRS configuration for an SRS resource set may indicate a usage (e.g., an SRS usage, sometimes referred to as a use case, which may be indicated in an SRS-SetUse information element) for the SRS resource set. For example, an SRS resource set may have a usage of antenna switching, codebook, non-codebook, beam management (sometimes referred to as uplink beam management), and/or the like. In some aspects, the UE 120 may use the same UE uplink beam to transmit SRS for the antenna switching usage and SRS for the codebook usage.

An antenna switching SRS resource set may be used to indicate downlink channel state information (CSI) with reciprocity between an uplink and downlink channel. For example, when there is reciprocity between an uplink channel and a downlink channel, a base station 110 may use an antenna switching SRS (e.g., an SRS transmitted using a resource of an antenna switching SRS resource set) to acquire downlink CSI (e.g., to determine a downlink precoder to be used to communicate with the UE 120, to estimate a downlink channel, and/or the like). Thus, in some cases, an antenna switching usage may be referred to as a downlink acquisition usage. As described in more detail elsewhere herein, in some aspects, the UE 120 may infer whether the base station 110 is using SRS for downlink operations (e.g., downlink channel estimation, B S downlink beam refinement, and/or the like) based at least in part on an SRS configuration for an antenna switching usage because antenna switching SRS are used for downlink acquisition (e.g., to indicate downlink CSI).

A codebook SRS resource set may be used to indicate uplink CSI when a base station 110 indicates an uplink precoder to the UE 120. For example, when the base station 110 is configured to indicate an uplink precoder to the UE 120 (e.g., using a precoder codebook), the base station 110 may use a codebook SRS (e.g., an SRS transmitted using a resource of a codebook SRS resource set) to acquire uplink CSI (e.g., to determine an uplink precoder to be indicated to the UE 120 and used by the UE 120 to communicate with the base station 110, to estimate an uplink channel, and/or the like). As described in more detail elsewhere herein, in some aspects, the UE 120 may infer whether the base station 110 is using SRS for downlink operations based at least in part on an SRS configuration for a codebook usage.

A non-codebook SRS resource set may be used to indicate uplink CSI when the UE 120 selects an uplink precoder (e.g., instead of the base station 110 indicating an uplink precoder to be used by the UE 120). For example, when the UE 120 is configured to select an uplink precoder, the base station 110 may use a non-codebook SRS (e.g., an SRS transmitted using a resource of a non-codebook SRS resource set) to acquire uplink CSI. In this case, the non-codebook SRS may be precoded using a precoder selected by the UE 120 (e.g., which may be indicated to the base station 110). The base station 110 may use the non-codebook SRS resource set to estimate an uplink channel.

A beam management SRS resource set may be used for indicating CSI for millimeter wave communications. For example, a beam management SRS resource set may be used to beam-sweeping SRS.

As shown in FIG. 8, in some aspects, different SRS resource sets indicated to the UE 120 (e.g., having different usages) may overlap (e.g., in time, in frequency, and/or the like, such as in the same slot). For example, as shown by reference number 815, a first SRS resource set (e.g., shown as SRS Resource Set 1) is shown as having an antenna switching usage. As shown, this example antenna switching SRS resource set includes a first SRS resource (shown as SRS Resource A) and a second SRS resource (shown as SRS Resource B). Thus, antenna switching SRS may be transmitted in SRS Resource A (e.g., a first time-frequency resource) using antenna port 0 and antenna port 1, and may be transmitted in SRS Resource B (e.g., a second time-frequency resource) using antenna port 2 and antenna port 3.

As shown by reference number 820, a second SRS resource set (e.g., shown as SRS Resource Set 2) may be a codebook usage. As shown, this example codebook SRS resource set includes only the first SRS resource (shown as SRS Resource A). Thus, codebook SRS may be transmitted in SRS Resource A (e.g., the first time-frequency resource) using antenna port 0 and antenna port 1. In this case, the UE 120 may not transmit codebook SRS in SRS Resource B (e.g., the second time-frequency resource) using antenna port 2 and antenna port 3.

As described in more detail below, the UE 120 may use the SRS configuration to determine whether to use distinct beam pairs for uplink and downlink communications (e.g., based at least in part on an inference about whether the base station 110 is using SRS for downlink operations). Additionally, or alternatively, the UE 120 may use the SRS configuration to select one or more beams (e.g., UE uplink beams, UE downlink beams, and/or the like). In this way, the UE can implement distinct UE beam pairs as appropriate (e.g., to satisfy an MPE constraint) while permitting the base station to correctly perform channel estimation.

As indicated above, FIG. 8 is provided as an example. Other examples are possible and may differ from what was described with regard to FIG. 8.

Figure 9:
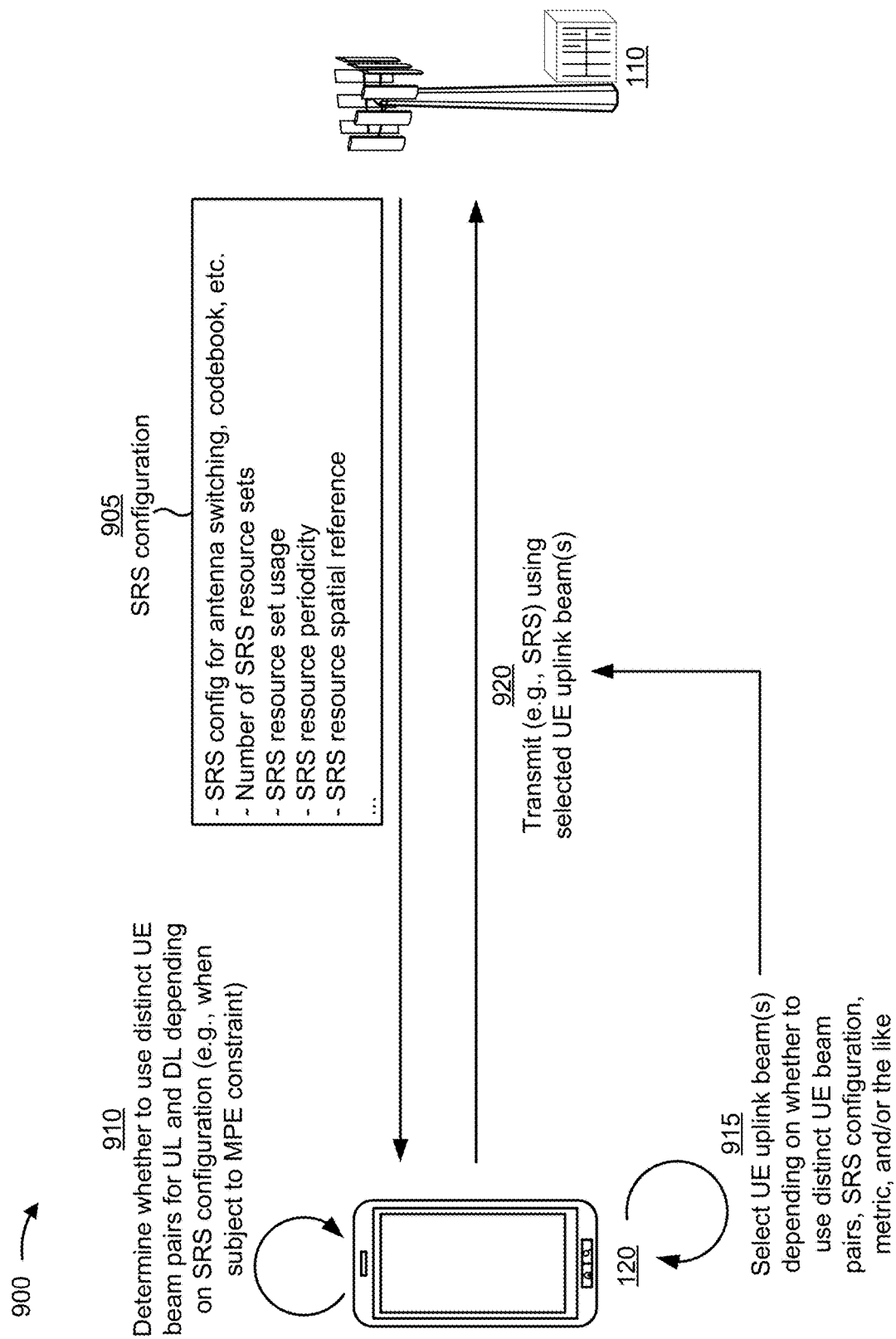

FIG. 9 is a diagram illustrating an example 900 of uplink beam selection in millimeter wave using an SRS configuration, in accordance with various aspects of the present disclosure.

As shown by reference number 905, a base station 110 may transmit, and a UE 120 may receive, an SRS configuration (e.g., which may include information as described above in connection with FIG. 8). The SRS configuration may indicate a configuration for the UE 120 to transmit SRS. For example, the SRS configuration may identify one or more SRS resource sets to be used to transmit SRS. An SRS resource set may include a set of resources (e.g., time resources, frequency resources, spatial resources, and/or the like) to be used by the UE 120 to transmit SRS. Additionally, or alternatively, the SRS configuration may identify a usage for an SRS resource set (e.g., an antenna switching usage, a codebook usage, a non-codebook usage, a beam management usage, and/or the like).

Additionally, or alternatively, the SRS configuration may identify one or more antenna ports to be used for an SRS resource set (e.g., one or more antenna ports via which an SRS is to be transmitted for the SRS resource set). In some aspects, the SRS configuration may indicate a single antenna port for an SRS resource set. In some aspects, the SRS configuration may indicate multiple antenna ports for an SRS resource set (e.g., two antenna ports, three antenna ports, and/or the like). Additionally, or alternatively, the SRS configuration may indicate whether two or more SRS resource sets (e.g., having different usages, such as antenna switching and codebook) overlap (e.g., whether a specific resource, such as a time resource, a frequency resource, and/or the like, is included in multiple SRS resource sets).

In some aspects, the SRS configuration may indicate a number of SRS resource sets configured for the UE 120. Additionally, or alternatively, the SRS configuration may indicate the usages for those SRS resource sets(s), thereby indicating a number of SRS resource sets configured for each specific usage. Additionally, or alternatively, the SRS configuration may indicate a time domain configuration for an SRS resource set, such as whether an SRS resource set is periodic, aperiodic, semi-persistent, and/or the like. Additionally, or alternatively, the SRS configuration may indicate a periodicity for an SRS resource set (e.g., how often SRS are to be transmitted in the time domain for the SRS resource set).

Additionally, or alternatively, the SRS configuration may indicate a spatial reference configuration for an SRS resource set, such as one or more spatial parameters (e.g., spatial domain filter(s), spatial relation(s), precoder(s), beam(s), and/or the like) to be used to transmit SRS for the SRS resource set. In some aspects, the spatial reference configuration may be indicated in an RRC message, in a media access control (MAC) control element (CE) (MAC-CE), in downlink control information (DCI), and/or the like. The SRS configuration may be used by the UE 120 to determine whether to use distinct UE beams for uplink and downlink communications and/or to select one or more beams for communicating with the base station 110, as described in more detail below.

As shown by reference number 910, the UE 120 may determine whether to use distinct UE beam pairs for uplink and downlink communications (e.g., as described in more detail above in connection with FIG. 3) based at least in part on the SRS configuration. In some aspects, the UE 120 may use only an SRS configuration for an antenna switching usage and/or a codebook usage (e.g., and not for a non-codebook usage or a beam management usage) to determine whether to use the distinct UE beam pairs. Antenna switching SRS may be used by the base station 110 to acquire downlink CSI, and codebook SRS may be used by the base station 110 to acquire uplink CSI. Thus, an SRS configuration for one or both of these usages may be used by the UE 120 to infer whether the base station 110 is using SRS, transmitted by the UE 120, to perform downlink operations (e.g., downlink channel estimation, downlink beam refinement, and/or the like).

For example, the UE 120 may determine whether to use distinct UE beam pairs for uplink and downlink communications based at least in part on a number of SRS resource sets configured for one or more SRS usages (e.g., a number of SRS resource sets configured for an antenna switching usage, a number of SRS resource sets configured for a codebook usage, and/or the like), whether an SRS resource is included in multiple SRS resource sets associated with different SRS usages (e.g., an antenna switching usage and a codebook usage), a time domain configuration indicated by the SRS configuration, a periodicity indicated by the SRS configuration (e.g., whether the periodicity for a specific usage, such as an antenna switching usage or a codebook usage, satisfies a threshold), a spatial reference configuration indicated by the SRS configuration, and/or the like.

In some aspects, one or more of these parameters or other parameters of an SRS configuration may be used by the UE 120 to infer whether the base station 110 is using SRS for downlink operations. In some aspects, if the UE 120 infers that the base station 110 is using the SRS for downlink operations, then the UE 120 may determine not to use distinct beam pairs for uplink and downlink communications (e.g., may use the same beam pair for uplink and downlink communications), thereby improving downlink performance (e.g., as compared to selecting distinct UE beam pairs for uplink and downlink) due to more accurate downlink channel estimation, downlink beam refinement, and/or the like. In some aspects, if the UE 120 infers that the base station 110 is not using the SRS for downlink operations, then the UE 120 may determine to use distinct beam pairs for uplink and downlink communications, thereby improving performance while satisfying an MPE constraint, as described above. Additional details and examples regarding inferring whether the base station 110 is using SRS for downlink operations are described below in connection with FIG. 10.

As shown by reference number 915, the UE 120 may select one or more UE uplink beams, for communicating with the base station 110 (e.g., for transmitting one or more SRS to the base station 110), based at least in part on determining whether to use the distinct UE beam pairs for uplink and downlink communications. Additionally, or alternatively, the UE 120 may select the one or more UE uplink beams based at least in part on the SRS configuration (e.g., one or more parameters indicated by the SRS configuration).

For example, in some aspects, if the UE 120 determines to use distinct UE beam pairs for uplink and downlink communications, then the UE 120 may select one or more UE uplink beams using only an uplink metric (e.g., and not a downlink metric) that takes one or more uplink parameters (e.g., a maximum transmit power for the UE 120 subject to an MPE constraint, a pathloss estimate, an estimated receive power at the base station 110, a target receive power at the base station 110, a virtual power headroom, and/or the like) into account when selecting the one or more UE uplink beams. Additionally, or alternatively, in some aspects, if the UE 120 determines to use the same UE beam pair for uplink and downlink communications, then the UE 120 may select one or more UE uplink beams using a joint metric that takes one or more uplink parameters and one or more downlink parameters (e.g., a signal to interference plus noise ratio (SINR) parameter, a reference signal received power (RSRP) parameter, a spectral efficiency parameter, and/or the like) into account when selecting the one or more UE uplink beams. In some aspects, the joint metric may represent a tradeoff between uplink and downlink performance when using the same beam pair for both uplink and downlink communications. In some aspects (as described in more detail below in connection with FIG. 11), the UE 120 may select the one or more UE uplink beams using only a downlink metric (e.g., and not an uplink metric) that takes into account one or more downlink parameters.

Additionally, or alternatively, the UE 120 may select the one or more UE uplink beams for an SRS resource based at least in part on an SRS usage of the SRS resource (e.g., an antenna switching usage, a codebook usage, and/or the like), whether the SRS resource is included in multiple SRS resource sets with different SRS usages, a number of antenna ports configured for the SRS resource, a spatial reference configuration for the SRS resource, a spatial reference configuration for a physical channel (e.g., a physical downlink shared channel (PDSCH), a physical uplink shared channel (PUSCH), a physical downlink control channel (PDCCH), a physical uplink control channel (PUCCH), and/or the like), whether a spatial reference configuration of the SRS resource and the channel are the same, a number of SRS resources included in an SRS resource set that includes the SRS resource, a number of SRS resource sets with a same usage as the SRS resource, and/or the like. Additional details and examples regarding selecting one or more UE uplink beams are described below in connection with FIG. 11.

As shown by reference number 920, the UE 120 may transmit using the one or more UE uplink beams. For example, the UE 120 may transmit information, such as one or more SRS (e.g., according to the SRS configuration), to the base station 110 using the one or more UE uplink beams. In some aspects, the UE 120 may select a UE uplink beam for an SRS resource based at least in part on an SRS configuration for the SRS resource and/or a determination of whether the UE 120 is to use distinct UE beam pairs for uplink and downlink communications, and may transmit SRS on the selected UE uplink beam for the SRS resource.

By determining whether to use distinct UE beam pairs for uplink and downlink communications based at least in part on an inference of whether a base station 110 is using SRS to perform downlink operations, the UE 120 may allow for accurate downlink channel estimation and/or downlink beam refinement by the base station 110 while complying with an MPE constraint. Furthermore, by using different input parameters for UE uplink beam selection based at least in part on determining whether to use distinct UE beam pairs for uplink and downlink beam pairs, the UE 120 may also improve performance while complying with the MPE constraint. In this way, the UE 120 can implement distinct UE beam pairs as appropriate (e.g., depending on an MPE constraint, an SRS configuration, and/or the like) while permitting the base station 110 to correctly perform channel estimation.

As indicated above, FIG. 9 is provided as an example. Other examples may differ from what was described with respect to FIG. 9.

FIG. 10 is a diagram illustrating an example 1000 of uplink beam selection in millimeter wave using an SRS configuration, in accordance with various aspects of the present disclosure.

FIG. 10 shows examples of how a UE 120 may use an SRS configuration (e.g., shown as an SRS resource configuration) to infer whether a base station 110 is using SRS for downlink operations and/or to determine whether to use distinct UE beam pairs for uplink and downlink communications. In some aspects, the UE 120 may implement a single example shown in FIG. 10, may implement multiple examples shown in FIG. 10, may implement different combinations of examples shown in FIG. 10 (e.g., in different scenarios), and/or may implement examples other than those shown in FIG. 10.

As shown by reference number 1005, in some aspects, the UE 120 may determine to use distinct UE beam pairs for uplink and downlink communications based at least in part on a determination that SRS resources are not configured for an antenna switching usage and/or that SRS resources are not configured for a codebook usage. For example, if there are not any SRS resources configured for an antenna switching usage, then the base station 110 may not be using SRS to acquire downlink CSI. As a result, using distinct beam pairs for uplink and downlink communications will not result in inaccurate downlink channel estimation. Additionally, or alternatively, if there are not any SRS resources configured for a codebook usage, then this may imply that the base station 110 is not performing channel estimation (e.g., on the uplink or downlink) for the UE 120 using SRS. Thus, the UE 120 may use distinct UE beam pairs to improve uplink performance, while complying with an MPE constraint, without negatively impacting downlink performance.

As shown by reference number 1010, in some aspects, the UE 120 may determine to use distinct UE beam pairs for uplink and downlink communications based at least in part on a determination that SRS resources, configured for an antenna switching usage and/or a codebook usage, are configured with a periodicity that satisfies a threshold. For example, if SRS resources are configured with a long periodicity (e.g., greater than or equal to a threshold, such as 2560 slots, 3 seconds, and/or the like), this may imply that the base station 110 is not using SRS for channel estimation because channel estimation using SRS may be unreliable with such a long periodicity for SRS transmissions. Thus, the UE 120 may use distinct UE beam pairs to improve uplink performance, while complying with an MPE constraint, without negatively impacting downlink performance.

As shown by reference number 1015, in some aspects, the UE 120 may determine to use distinct UE beam pairs for uplink and downlink communications based at least in part on a determination that a first SRS resource set is configured with an antenna switching usage and a second SRS resource set is configured with a codebook usage. For example, having SRS configured for both of these usages may imply that the base station 110 is not going to use SRS for downlink operations. Thus, the UE 120 may use distinct UE beam pairs to improve uplink performance, while complying with an MPE constraint, without negatively impacting downlink performance.

As shown by reference number 1020, in some aspects, the UE 120 may determine to use the same UE beam pair for uplink and downlink communications if none of the conditions described above (e.g., in connection with reference numbers 1005, 1010, and 1015) are satisfied. For example, the UE 120 may determine to use the same UE beam pair for uplink and downlink communications based at least in part on a determination that only a single SRS resource set is configured (e.g., with an antenna switching usage or a codebook usage), based at least in part on a determination that all configured SRS resource sets are configured with the same usage, and/or the like. These SRS configurations may imply that the base station 110 uses SRS for downlink operations. Thus, the UE 120 may use the same beam pair for uplink and downlink communications to avoid negatively impacting downlink performance.

As indicated above, FIG. 10 is provided as an example. Other examples may differ from what was described with respect to FIG. 10.

Figure 11:
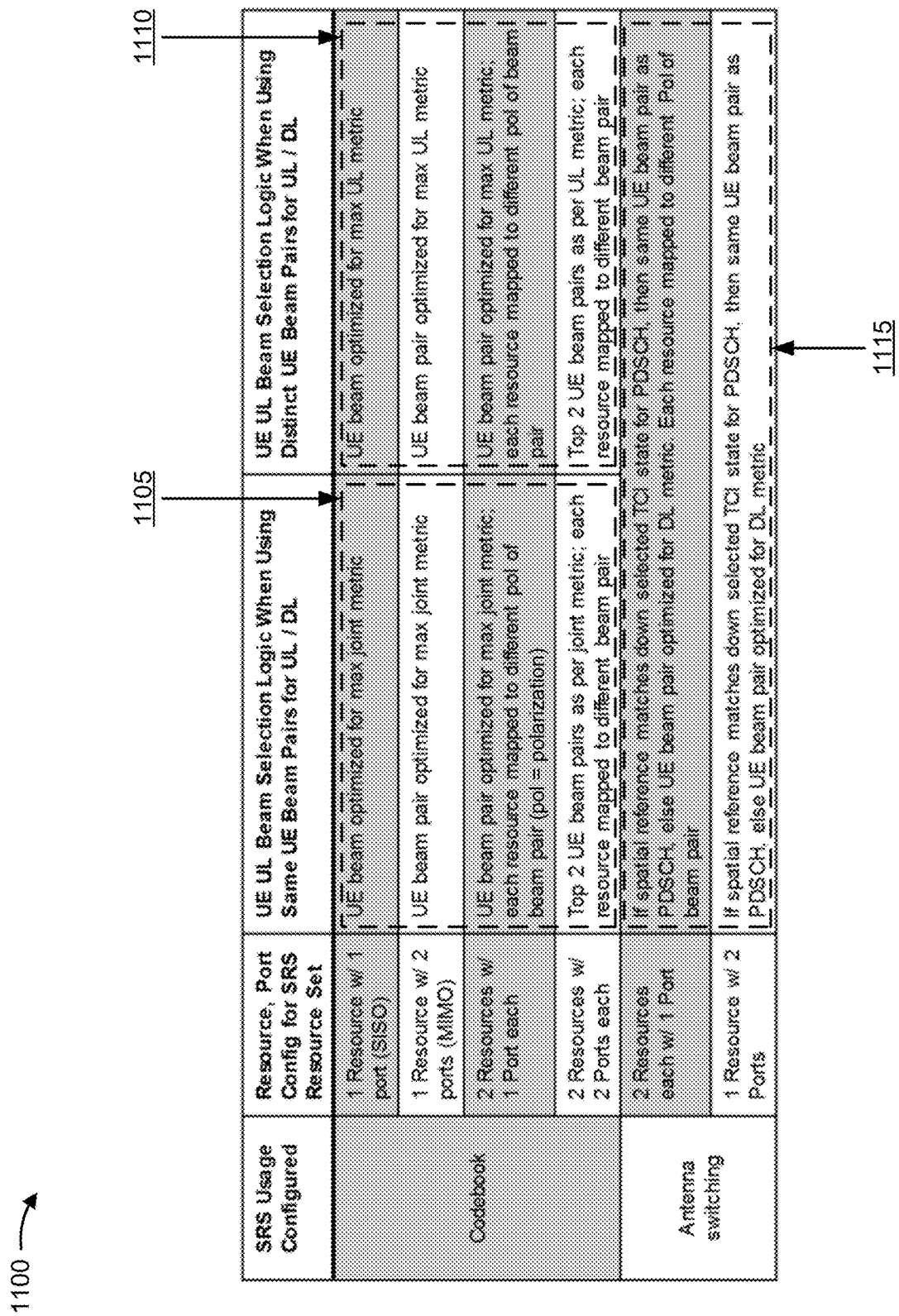

FIG. 11 is a diagram illustrating an example 1100 of uplink beam selection in millimeter wave using an SRS configuration, in accordance with various aspects of the present disclosure.

FIG. 11 shows examples of how a UE 120 may use an SRS configuration and/or a determination of whether to use distinct UE beam pairs for uplink and downlink communications to select one or more UE uplink beams. In some aspects, the UE 120 may implement a single example shown in FIG. 11, may implement multiple examples shown in FIG. 11, may implement different combinations of examples shown in FIG. 11 (e.g., in different scenarios), and/or may implement examples other than those shown in FIG. 11.

As shown by reference number 1105, for a codebook SRS resource, the UE 120 may use a joint metric (e.g., as described above in connection with FIG. 9) to select UE uplink beam(s) based at least in part on a determination that the UE 120 is to use a same UE beam pair for uplink and downlink communications. For example, the UE 120 may select a single UE beam pair for uplink and downlink communications (e.g., shown as UE beam to denote a single UE uplink beam), or may select multiple UE beam pairs that are each used for both uplink and downlink communications (e.g., shown as UE beam pair to denote two UE uplink beams). In some aspects, the UE 120 may select a single UE beam pair for uplink and downlink communications if a single antenna port is configured for the codebook SRS resource (e.g., in a specific time resource). In some aspects, the UE 120 may select multiple (e.g., shown as two) UE beam pairs, that are each used for both uplink and downlink communications, if multiple (e.g., shown as two) antenna ports configured for the codebook SRS resource (e.g., in a specific time resource). As further shown, the UE 120 may map SRS resources to beams (e.g., an individual UE uplink beam of a pair of UE uplink beams having the same polarization (pol) or different polarizations) based at least in part on a number of SRS resources and/or a number of antenna ports indicated in the SRS configuration.

As shown by reference number 1110, for the codebook SRS resource, the UE 120 may use an uplink metric (e.g., as described above in connection with FIG. 9) to select UE uplink beam(s) based at least in part on a determination that the UE 120 is to use distinct UE beam pairs for uplink and downlink communications. As indicated above, the UE 120 may select a single UE beam pair for uplink and downlink communications if a single antenna port is configured for the codebook SRS resource, or may select multiple (e.g., shown as two) UE beam pairs, that are each used for both uplink and downlink communications, if multiple (e.g., shown as two) antenna ports configured for the codebook SRS resource. As also indicated above, the UE 120 may map SRS resources to beams based at least in part on a number of SRS resources and/or a number of antenna ports indicated in the SRS configuration.

As shown by reference number 1115, for an antenna switching SRS resource, the UE 120 may select UE uplink beam(s) for SRS as the same UE uplink beam(s) selected for the PDSCH (and/or another channel) if a spatial reference configuration for the SRS resources is the same as a spatial reference configuration for the PDSCH (and/or the other channel). If those spatial references are not the same, then the UE 120 may use a downlink metric (e.g., as described above in connection with FIG. 9) to select the UE uplink beam(s) for SRS. As described above, the UE 120 may map SRS resources to UE uplink beams based at least in part on a number of SRS resources and/or a number of antenna ports indicated in the SRS configuration.

As indicated above, FIG. 11 is provided as an example. Other examples may differ from what was described with respect to FIG. 11.

FIG. 12 is a diagram illustrating an example process 1200 performed, for example, by a UE, in accordance with various aspects of the present disclosure. Example process 1200 is an example where a UE (e.g., UE 120 and/or the like) performs operations associated with uplink beam selection in millimeter wave using an SRS configuration.

As shown in FIG. 12, in some aspects, process 1200 may include determining whether to use distinct UE beam pairs for uplink and downlink communications with a base station based at least in part on a sounding reference signal (SRS) configuration for the UE (block 1210). For example, the UE (e.g., using controller/processor 280 and/or the like) may determine whether to use distinct UE beam pairs for uplink and downlink communications with a base station based at least in part on an SRS configuration for the UE, as described above.

As shown in FIG. 12, in some aspects, process 1200 may include selecting one or more UE uplink beams for communicating with the base station based at least in part on determining whether to use the distinct UE beam pairs for uplink and downlink communications (block 1220). For example, the UE (e.g., using controller/processor 280 and/or the like) may select one or more UE uplink beams for communicating with the base station based at least in part on determining whether to use the distinct UE beam pairs for uplink and downlink communications, as described above.

As shown in FIG. 12, in some aspects, process 1200 may include transmitting using the one or more UE uplink beams (block 1230). For example, the UE (e.g., using controller/processor 280, transmit processor 264, TX MIMO processor 266, MOD 254, antenna 252, and/or the like) may transmit using the one or more UE uplink beams, as described above.

Process 1200 may include additional aspects, such as any single aspect and/or any combination of aspects described below and/or in connection with one or more other processes described elsewhere herein.

In some aspects, the SRS configuration is for at least one of an antenna switching usage, a codebook usage, or a combination thereof. In some aspects, transmitting using the one or more UE uplink beams comprises transmitting SRS using the one or more UE uplink beams based at least in part on the SRS configuration. In some aspects, the determination of whether to use distinct UE beam pairs is based at least in part on at least one of: a number of SRS resource sets configured for one or more SRS usages, whether an SRS resource is included in multiple SRS resource sets associated with different SRS usages, a time domain configuration indicated by the SRS configuration, a periodicity indicated by the SRS configuration, a spatial reference configuration indicated by the SRS configuration, or a combination thereof.

In some aspects, the UE is configured to use the distinct UE beam pairs based at least in part on a determination that SRS resources are not configured for an antenna switching usage, a codebook usage, or a combination thereof. In some aspects, the UE is configured to use the distinct UE beam pairs based at least in part on a determination that SRS resources for at least one of an antenna switching usage or a codebook usage are configured with a periodicity that satisfies a threshold. In some aspects, the UE is configured to use the distinct UE beam pairs based at least in part on a determination that a first SRS resource set is configured with an antenna switching usage and a second SRS resource set is configured with a codebook usage. In some aspects, the UE is configured to use a same UE beam pair for uplink and downlink communications with the base station based at least in part on a determination that: only a single SRS resource set is configured, or all SRS resource sets are configured with a same SRS usage.

In some aspects, the one or more UE uplink beams are selected for an SRS resource based at least in part on the SRS configuration. In some aspects, the one or more UE uplink beams are selected for an SRS resource based at least in part on at least one of: an SRS usage of the SRS resource, whether the SRS resource is included in multiple SRS resource sets with different SRS usages, a number of antenna ports configured for the SRS resource, a spatial reference configuration for the SRS resource, a spatial reference configuration for a physical channel, a number of SRS resources included in an SRS resource set that includes the SRS resource, a number of SRS resource sets with a same usage as the SRS resource, or a combination thereof.

In some aspects, the one or more UE uplink beams are selected for an SRS resource based at least in part on at least one of: only an uplink metric, only a downlink metric, or a joint metric that is based at least in part on one or more uplink parameters and one or more downlink parameters.

Although FIG. 12 shows example blocks of process 1200, in some aspects, process 1200 may include additional blocks, fewer blocks, different blocks, or differently arranged blocks than those depicted in FIG. 12. Additionally, or alternatively, two or more of the blocks of process 1200 may be performed in parallel.

The foregoing disclosure provides illustration and description, but is not intended to be exhaustive or to limit the aspects to the precise form disclosed. Modifications and variations are possible in light of the above disclosure or may be acquired from practice of the aspects.

As used herein, the term component is intended to be broadly construed as hardware, firmware, or a combination of hardware and software. As used herein, a processor is implemented in hardware, firmware, or a combination of hardware and software.

Some aspects are described herein in connection with thresholds. As used herein, satisfying a threshold may refer to a value being greater than the threshold, greater than or equal to the threshold, less than the threshold, less than or equal to the threshold, equal to the threshold, not equal to the threshold, and/or the like.

It will be apparent that systems and/or methods, described herein, may be implemented in different forms of hardware, firmware, or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of possible aspects. In fact, many of these features may be combined in ways not specifically recited in the claims and/or disclosed in the specification. Although each dependent claim listed below may directly depend on only one claim, the disclosure of possible aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the term "one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (UE), comprising:
   determining, by the UE and for a candidate UE uplink beam, a transmit power due to a maximum permissible exposure (MPE) constraint;
   estimating, by the UE and for the candidate UE uplink beam, a receive power for a base station based at least in part on the transmit power due to the MPE constraint;
   determining, by the UE, a target receive power for the base station; and
   selecting, by the UE, the candidate UE uplink beam as an active UE uplink beam based at least in part on the estimated receive power for the base station and the target receive power for the base station.

2. The method of claim 1, wherein the candidate UE uplink beam is selected as the active UE uplink beam based at least in part on a virtual power headroom value that represents a difference between the estimated receive power for the base station and the target receive power for the base station.

3. The method of claim 2, wherein the difference is determined based at least in part on multiple samples filtered over a time period.

4. The method of claim 2, wherein the candidate UE uplink beam is selected as the active UE uplink beam based at least in part on a determination that the candidate UE uplink beam has a maximum virtual power headroom value as compared to other candidate UE uplink beams.

5. The method of claim 4, wherein the candidate UE uplink beam is selected as the active UE uplink beam based at least in part on at least one of:
   a determination that the candidate UE uplink beam has the maximum virtual power headroom value for a threshold amount of time,
   a determination that the maximum virtual power headroom value satisfies a threshold as compared to virtual power headroom values of the other candidate UE uplink beams, or
   a combination thereof.

6. The method of claim 2, wherein the candidate UE uplink beam is selected as the active UE uplink beam over another candidate UE uplink beam based at least in part on a determination that the candidate UE uplink beam has a greater virtual power headroom value as compared to the other candidate UE uplink beam.

7. The method of claim 6, wherein the candidate UE uplink beam is selected as the active UE uplink beam based at least in part on at least one of:
- a determination that the candidate UE uplink beam has the greater virtual power headroom value for a threshold amount of time,
- a determination that the virtual power headroom value for the candidate UE uplink beam is greater than that of the other candidate UE uplink beam by a threshold amount, or
- a combination thereof.

8. The method of claim 2, wherein the virtual power headroom value is reported to the base station.

9. The method of claim 1, wherein the candidate UE uplink beam is selected as the active UE uplink beam based at least in part on a determination that the candidate UE uplink beam has a maximum difference between the estimated receive power and the target receive power as compared to other candidate UE uplink beams.

10. The method of claim 9, wherein the candidate UE uplink beam is selected as the active UE uplink beam based at least in part on at least one of:
- a determination that the candidate UE uplink beam has the maximum difference for a threshold amount of time,
- a determination that the candidate UE uplink beam has the maximum difference by a threshold amount, or
- a combination thereof.

11. The method of claim 1, wherein the candidate UE uplink beam is selected as the active UE uplink beam over another candidate UE uplink beam based at least in part on a determination that the candidate UE uplink beam has a greater difference between the estimated receive power and the target receive power as compared to the other candidate UE uplink beam.

12. The method of claim 11, wherein the candidate UE uplink beam is selected as the active UE uplink beam based at least in part on at least one of:
- a determination that the candidate UE uplink beam has the greater difference for a threshold amount of time,
- a determination that the candidate UE uplink beam has the greater difference by a threshold amount, or
- a combination thereof.

13. The method of claim 1, wherein the estimated receive power for the base station is determined based at least in part on a pathloss estimate.

14. The method of claim 1, wherein the target receive power for the base station is determined based at least in part on at least one of a configured power parameter per resource block, a scaling factor for uplink grant size, or a scaling factor for modulation and coding scheme.

15. The method of claim 1, wherein the candidate UE uplink beam is not reciprocal with an active downlink beam for the UE.

16. The method of claim 15, further comprising determining to select the candidate UE uplink beam, that is not reciprocal with the active downlink beam, based at least in part on a sound reference signal (SRS) configuration for the UE.

17. The method of claim 16, further comprising determining to select the candidate UE uplink beam, that is not reciprocal with the active downlink beam, based at least in part on at least one of:
- a number of SRS resource sets configured for one or more SRS usages,
- whether an SRS resource is included in multiple SRS resource sets associated with different SRS usages,
- a time domain configuration indicated by the SRS configuration,
- a periodicity indicated by the SRS configuration,
- a spatial reference configuration indicated by the SRS configuration,
- a determination that SRS resources are not configured for an antenna switching usage, a codebook usage, or a combination thereof,
- a determination that SRS resources for at least one of an antenna switching usage or a codebook usage are configured with a periodicity that satisfies a threshold,
- a determination that a first SRS resource set is configured with an antenna switching usage and a second SRS resource set is configured with a codebook usage, or
- a combination thereof.

18. The method of claim 1, wherein the candidate UE uplink beam is selected as the active UE uplink beam based at least in part on a determination that the base station is not configured to use uplink communications for downlink estimation.

19. The method of claim 1, wherein the candidate UE uplink beam is selected as the active UE uplink beam based at least in part on a different metric than is used for UE downlink beam selection.

20. The method of claim 1, further comprising receiving an indication of an active BS downlink beam and an active BS uplink beam from the base station, wherein the active BS downlink beam and the active BS uplink beam are indicated using different spatial references.

21. A method of wireless communication performed by a base station (BS), comprising:
- selecting an active BS downlink beam based at least in part on a first metric reported by a user equipment (UE);
- receiving, from a UE, a second metric, different from the first metric, that is based at least in part on at least one of an estimated receive power for the base station or a target receive power for the base station, wherein the estimated receive power is estimated by the UE, and wherein the target receive power are determined by the UE;
- selecting an active BS uplink beam based at least in part on the second metric; and
- transmitting an indication of the active BS downlink beam and the active BS uplink beam to the UE, wherein the active BS downlink beam and the active BS uplink beam are indicated using different spatial references.

22. The method of claim 21, wherein the active BS downlink beam and the active BS uplink beam do not form a reciprocal beam pair.

23. The method of claim 21, wherein the first metric is a reference signal receive power (RSRP) value, and the second metric is a virtual power headroom value that represents a difference between the estimated receive power for the base station and the target receive power for the base station.

24. The method of claim 21, wherein the second metric further includes or is based at least in part on at least one of:
- a transmit power for the UE due to a maximum permissible exposure (MPE) constraint,
- a pathloss estimate for the base station and the UE, or
- a combination thereof.

25. The method of claim 21, wherein the active BS uplink beam is selected based at least in part on a plurality of second metrics, corresponding to a plurality of candidate uplink beams, reported to the base station by the UE.

26. The method of claim 21, wherein the active BS uplink beam is selected from a plurality of candidate uplink beams, corresponding to a plurality of second metrics, reported to the base station by the UE.

27. The method of claim 21, wherein the second metric is reported to the base station by the UE based at least in part on at least one of:
a configured periodicity,
a request from the base station,
a determination that a reporting condition is satisfied, or
a combination thereof.

28. The method of claim 27, wherein the reporting condition includes at least one of:
a change to a maximum permissible exposure (MPE) constraint at the UE,
a change to a UE-specific constraint,
a change to an environmental constraint associated with the UE, or
a combination thereof.

29. A user equipment (UE) for wireless communication, comprising:
a memory; and
one or more processors operatively coupled to the memory, the memory and the one or more processors configured to:
determine, for a candidate UE uplink beam, a transmit power due to a maximum permissible exposure (MPE) constraint;
estimate, for the candidate UE uplink beam, a receive power for a base station based at least in part on the transmit power due to the MPE constraint;
determine a target receive power for the base station; and
select the candidate UE uplink beam as an active UE uplink beam based at least in part on the estimated receive power for the base station and the target receive power for the base station.

30. A base station for wireless communication, comprising:
a memory; and
one or more processors operatively coupled to the memory, the memory and the one or more processors configured to:
select an active BS downlink beam based at least in part on a first metric reported by a user equipment (UE);
receive, from a UE, a second metric, different from the first metric, that is based at least in part on at least one of an estimated receive power for the base station or a target receive power for the base station, wherein the estimated receive power is estimated by the UE, and wherein the target receive power are determined by the UE;
select an active BS uplink beam based at least in part on the second metric; and
transmit an indication of the active BS downlink beam and the active BS uplink beam to the UE, wherein the active BS downlink beam and the active BS uplink beam are indicated using different spatial references.

* * * * *